(12) United States Patent
Cavenaugh et al.

(10) Patent No.: US 11,054,985 B2
(45) Date of Patent: Jul. 6, 2021

(54) APPARATUS, METHOD, AND PROGRAM PRODUCT FOR TRANSFERRING OBJECTS BETWEEN MULTIPLE DISPLAYS

(71) Applicant: LENOVO (Singapore) PTE. LTD., New Tech Park (SG)

(72) Inventors: Adam Jerome Cavenaugh, Cary, NC (US); Hidetoshi Mori, Yamato (JP); Kenneth Scott Seethaler, Wake Forest, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/368,700

(22) Filed: Mar. 28, 2019

(65) Prior Publication Data
US 2020/0310636 A1     Oct. 1, 2020

(51) Int. Cl.
| | | |
|---|---|---|
| G06F 3/0484 | (2013.01) | |
| G06F 3/0483 | (2013.01) | |
| G06F 3/0488 | (2013.01) | |
| G06F 3/14 | (2006.01) | |

(52) U.S. Cl.
CPC ........ *G06F 3/04883* (2013.01); *G06F 3/0484* (2013.01); *G06F 3/1423* (2013.01); *G06F 2203/04808* (2013.01)

(58) Field of Classification Search
CPC .................... G06F 3/0484; G06F 2203/04808
See application file for complete search history.

(56) References Cited

U.S. PATENT DOCUMENTS

| | | | | |
|---|---|---|---|---|
| 2007/0146347 A1* | 6/2007 | Rosenberg | ............. | G08C 17/02 345/173 |
| 2010/0066698 A1* | 3/2010 | Seo | ........................ | G06F 9/4843 345/173 |
| 2010/0262928 A1* | 10/2010 | Abbott | .............. | H04M 1/72552 715/769 |
| 2012/0038541 A1* | 2/2012 | Song | ..................... | G06F 3/1423 345/1.1 |
| 2012/0144347 A1* | 6/2012 | Jo | ......................... | G06F 3/0486 715/863 |
| 2012/0266079 A1* | 10/2012 | Lee | ...................... | G06F 16/9574 715/744 |
| 2013/0132885 A1* | 5/2013 | Maynard | ............. | G06F 3/04883 715/777 |
| 2015/0339049 A1* | 11/2015 | Kasemset | ............. | G06F 3/0482 715/728 |
| 2016/0026358 A1* | 1/2016 | Stewart | ................. | G06F 3/0481 715/781 |
| 2019/0339855 A1* | 11/2019 | Walkin | .................. | G06F 3/0485 |

* cited by examiner

*Primary Examiner* — Rayeez R Chowdhury
(74) *Attorney, Agent, or Firm* — Kunzler Bean & Adamson

(57) ABSTRACT

Apparatus, methods, and program products are disclosed for transferring objects between multiple displays. One apparatus includes a processor and a memory that stores code executable by the processor. The code is executable by the processor to detect a first edge swipe performed by a first set of user fingers on a first object on a first touch screen of a computing device. The code is further executable by the processor to move the first object from the first touch screen to a second touch screen of the computing device in response to detecting the first edge swipe. Methods and computer program products that perform the functions of the apparatus are also disclosed.

20 Claims, 39 Drawing Sheets

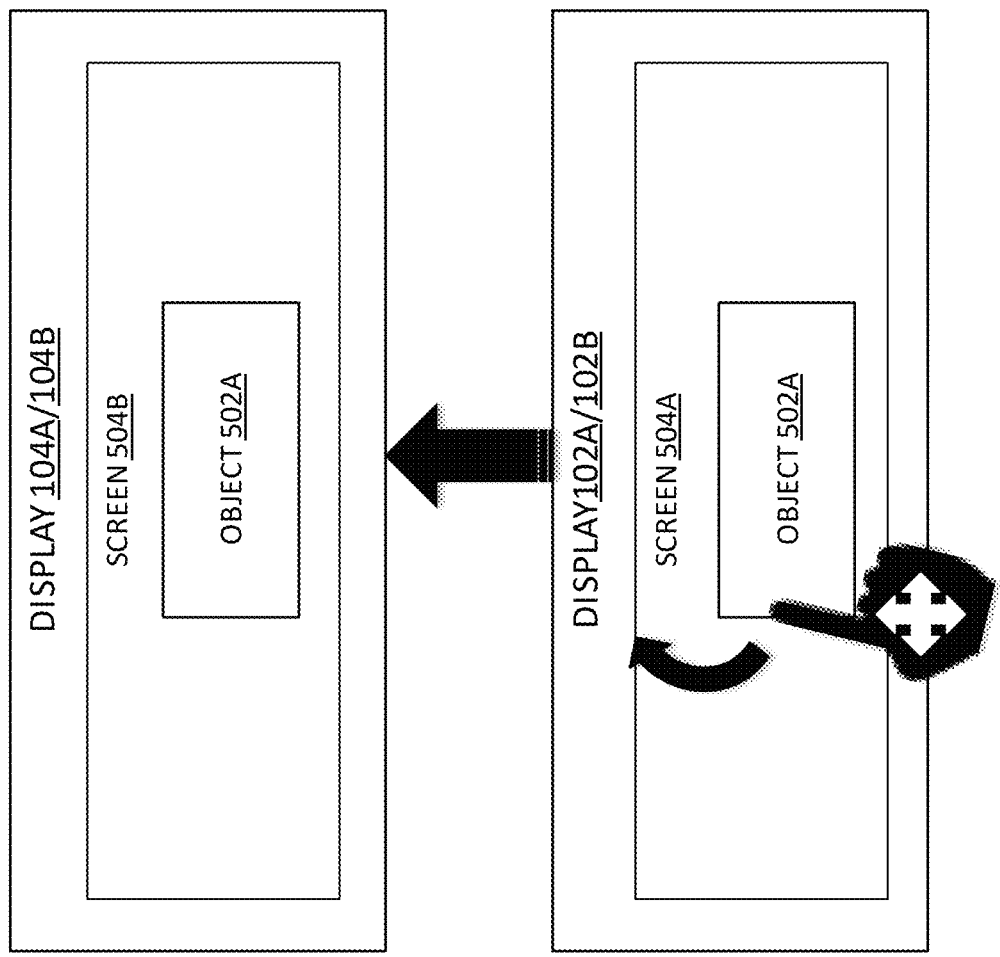

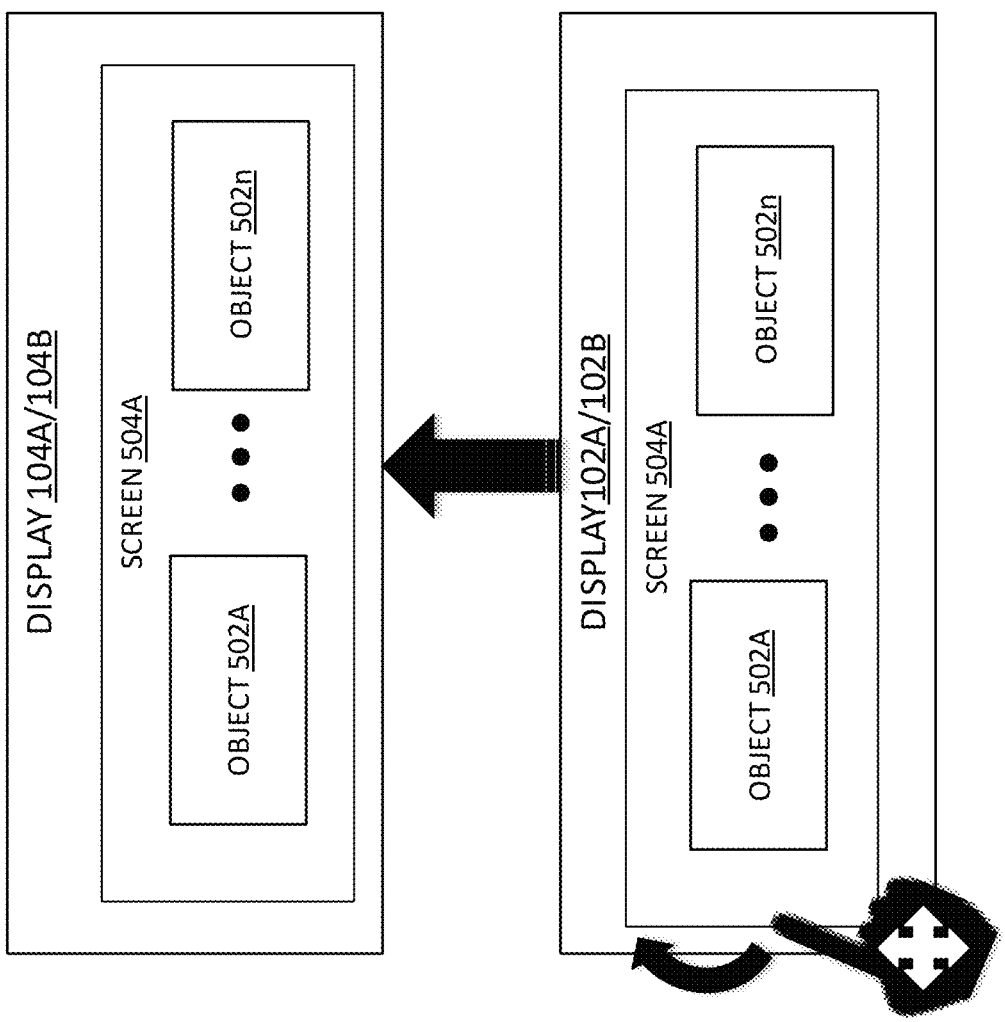

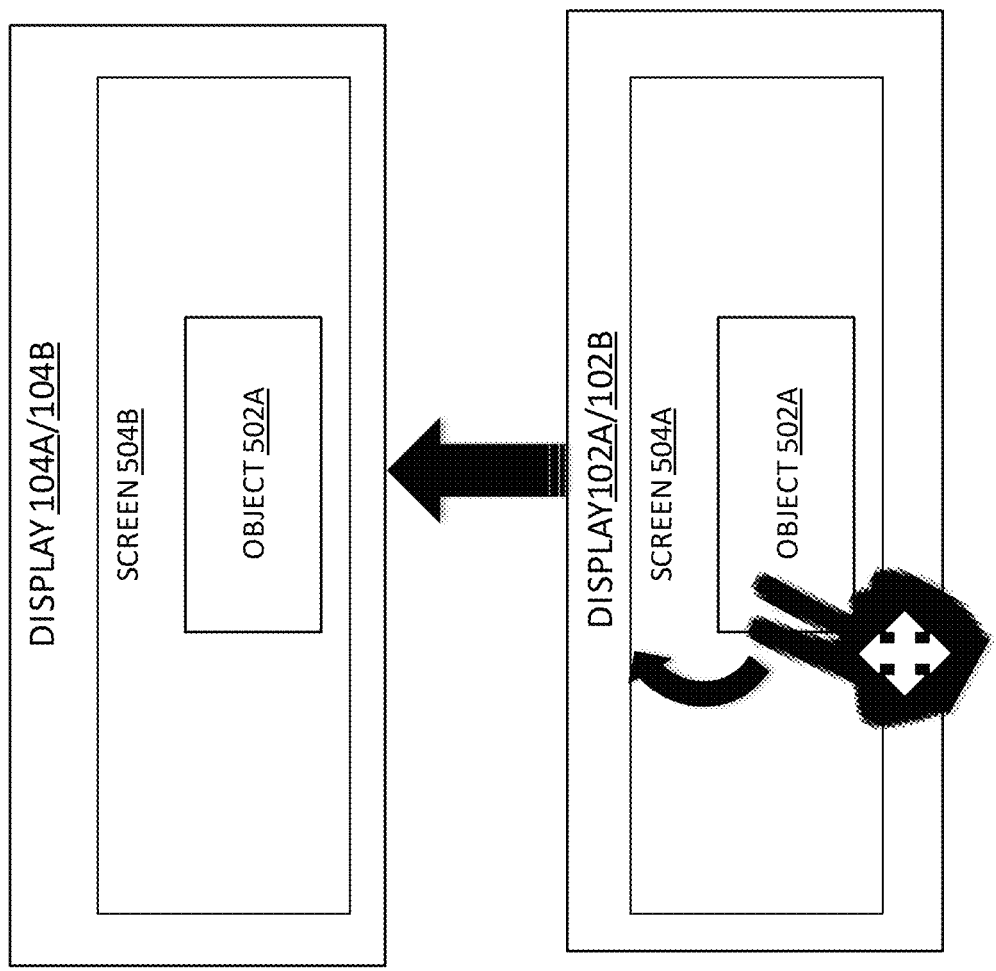

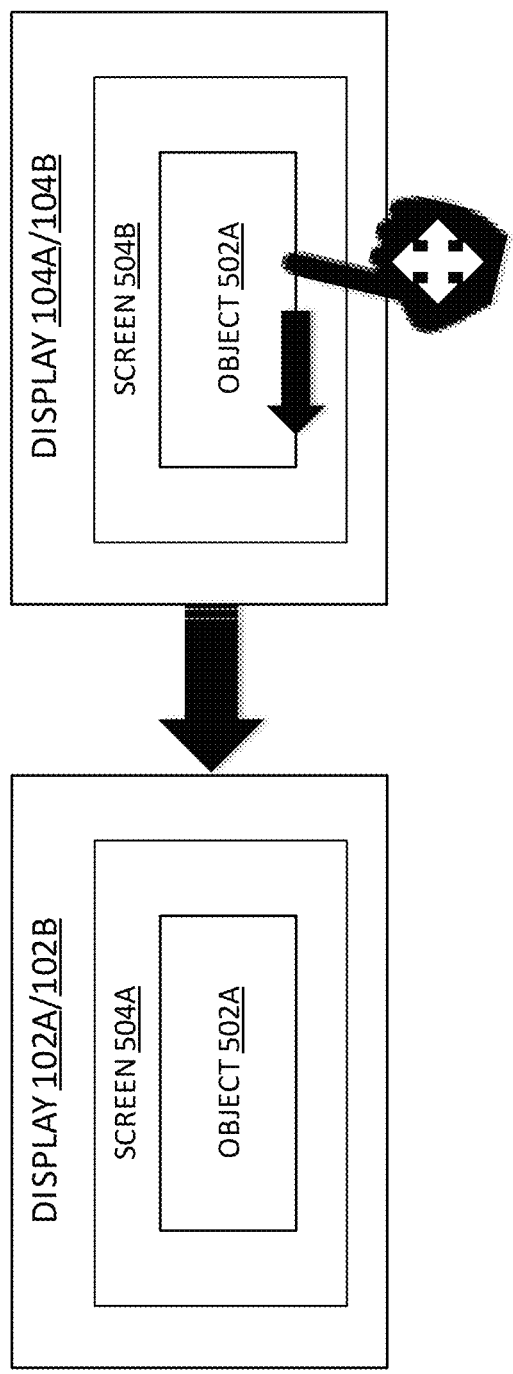

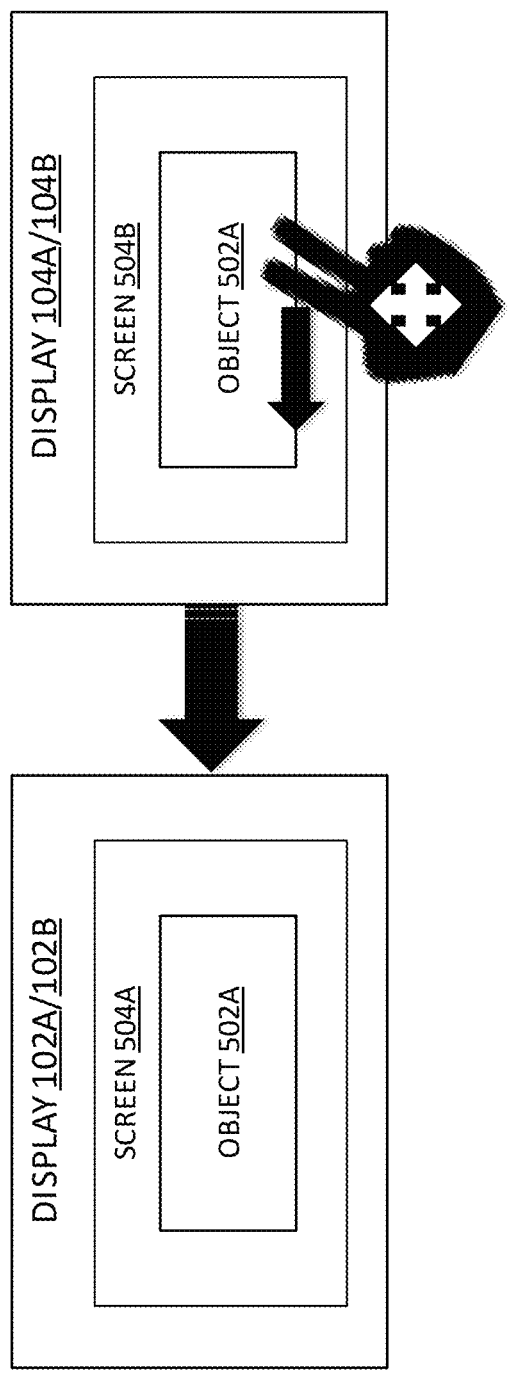

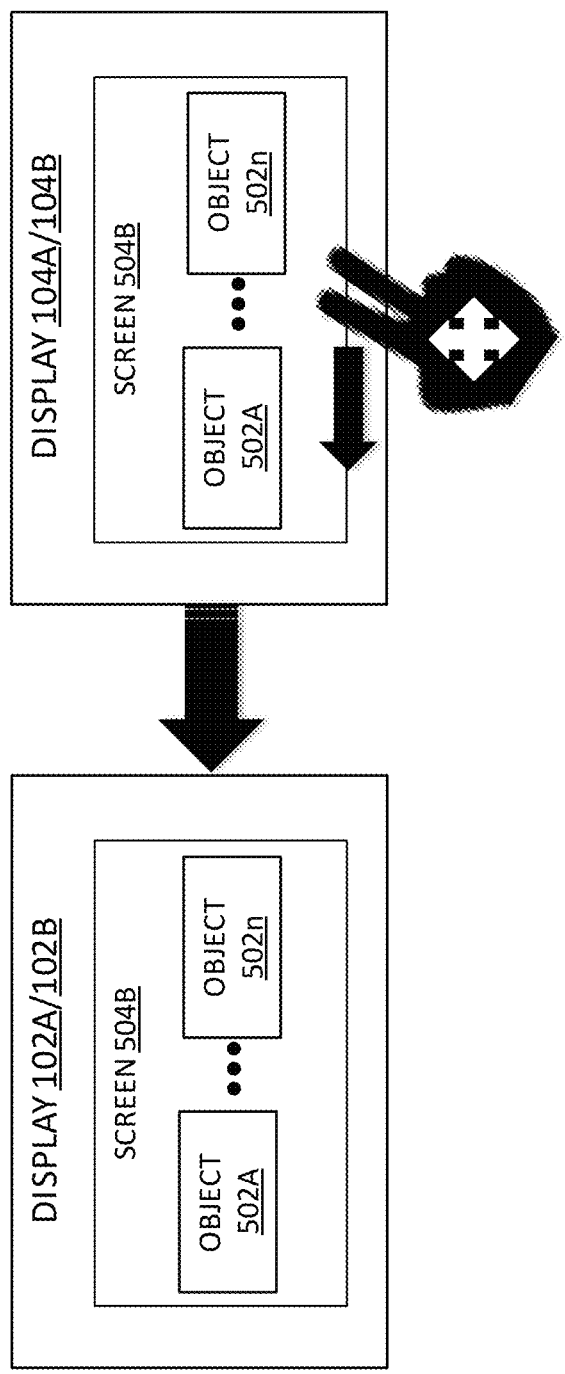

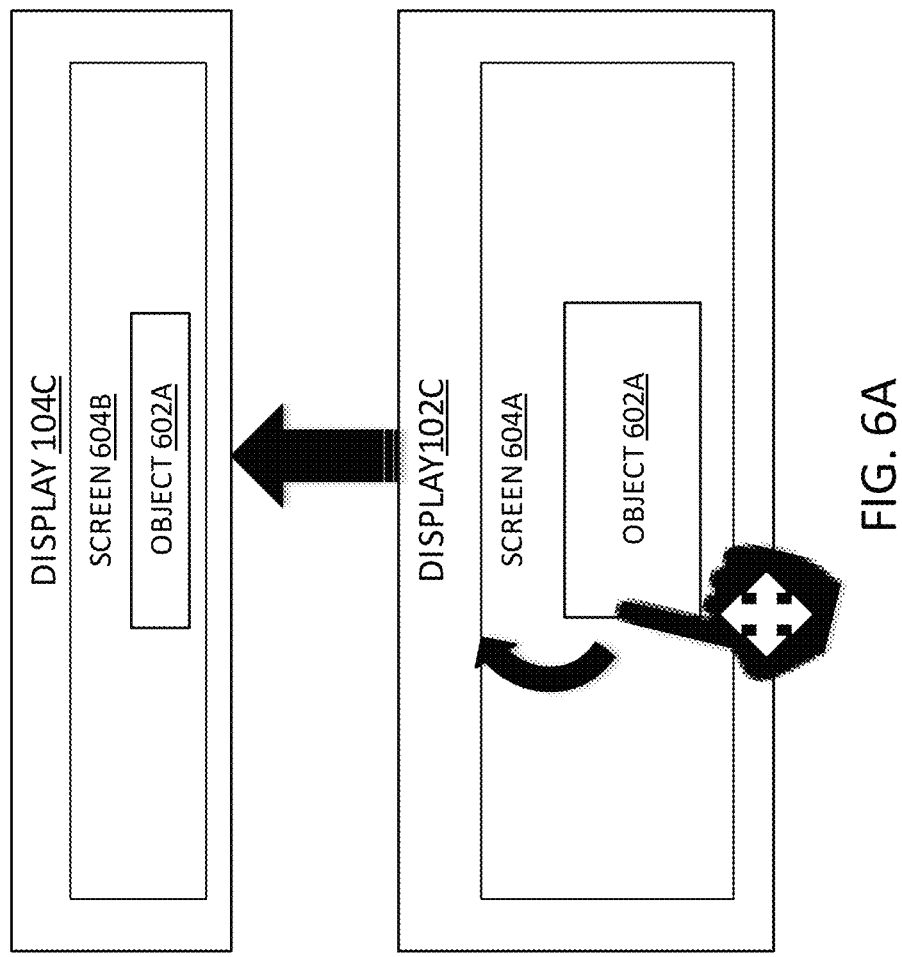

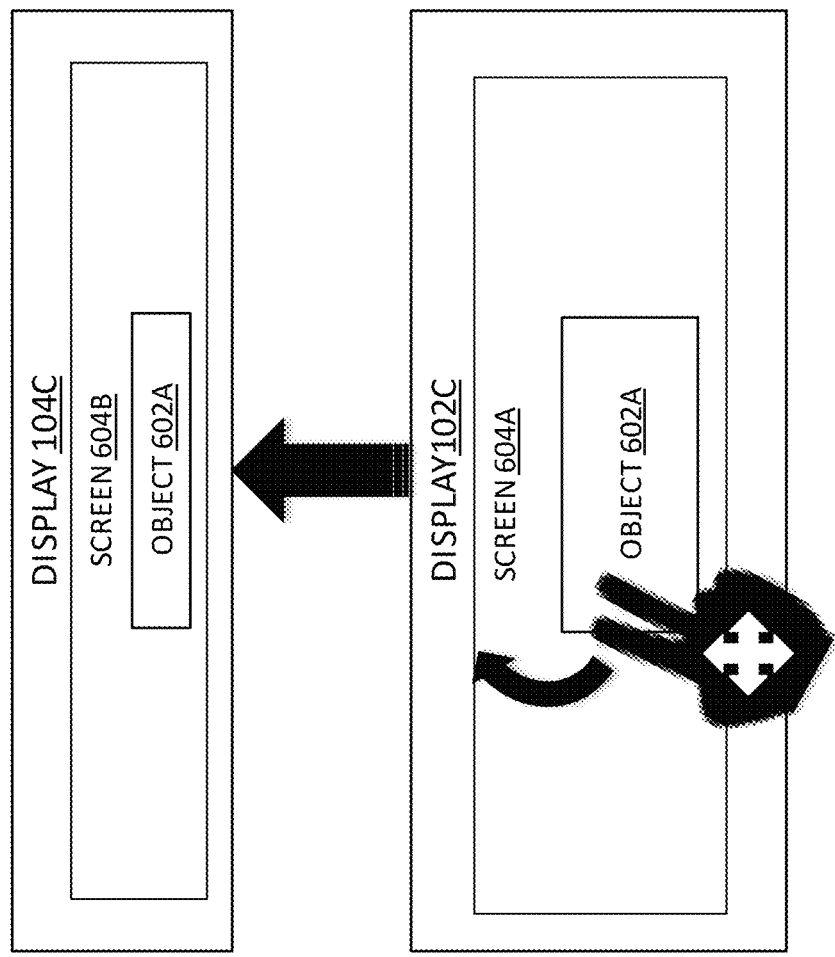

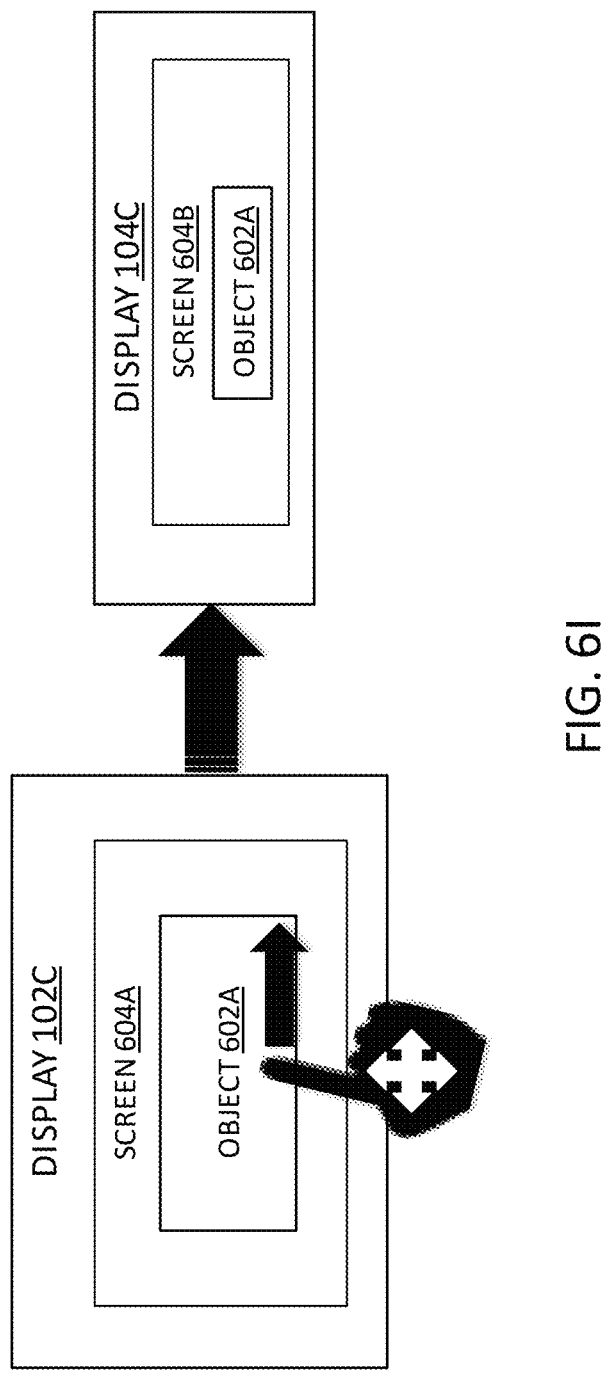

APPARATUS, METHOD, AND PROGRAM PRODUCT FOR TRANSFERRING OBJECTS BETWEEN MULTIPLE DISPLAYS

FIELD

The subject matter disclosed herein relates to computing displays and more particularly relates to transferring objects between multiple displays.

DESCRIPTION OF THE RELATED ART

Information handling devices, such as desktop computers, laptop computers, tablet computers, smart phones, optical head-mounted display units, smart watches, smart devices, voice-controlled electronic devices, televisions, streaming devices, etc., are ubiquitous in society. Some information handling devices can include and/or be connected to multiple displays. In working with multiple displays, a user utilizes a mouse, finger, or stylus to drag an object from one display to another display, which can be burdensome and/or an inefficient way of moving an object from one display to another display.

BRIEF SUMMARY

An apparatus for transferring objects between multiple displays is disclosed. A method and computer program product also perform the functions of the apparatus. In one embodiment, the apparatus includes a processor and a memory that stores code executable by the processor. The code, in various embodiments, is executable by the processor to detect an edge swipe performed by a set of user fingers on an object on a first touch screen of a computing device. The code, in certain embodiments, is executable by the processor to move the object from the first touch screen to a second touch screen of the computing device in response to detecting the edge swipe.

In some embodiments, the object includes a single applet or the entire content being displayed on the first touch screen. In additional or alternative embodiments, the object includes the entire content being displayed on the touch screen and detecting the edge swipe performed by the set of user fingers includes detecting the edge swipe performed by a single user finger or a pair of user fingers. In further additional or alternative embodiments, the first touch screen is a main display or a sub-display and the second touch screen is a different one of the main display or the sub-display than the first touch screen.

In various embodiments, the object includes a single applet and detecting the edge swipe performed by the set of user fingers includes detecting the edge swipe performed by a single user finger or a pair of user fingers. In additional or alternative embodiments, the first touch screen is a main display or a sub-display and the second touch screen is a different one of the main display or the sub-display than the first touch screen.

A method, in one embodiment, includes detecting, by a processor, a first edge swipe performed by a first set of user fingers on a first object on a first touch screen of a computing device. In certain embodiments, the method further includes moving the first object from the first touch screen to a second touch screen of the computing device in response to detecting the first edge swipe.

In some embodiments, the first object includes a single applet or the entire content being displayed on the first touch screen. In further embodiments, detecting the first edge swipe performed by the first set of user fingers comprises detecting the first edge swipe performed by a single user finger or a pair of user fingers for the single applet a different one of the single user finger and the pair of user fingers for the entire content being displayed on the first touch screen. In additional embodiments, the first touch screen is a main display or a sub-display and the second touch screen is a different one of the main display and the sub-display than the first touch screen In various embodiments, the method further includes detecting a second edge swipe performed by a second set of user fingers on a second object on the first touch screen and moving the second object from the first touch screen to the second touch screen in response to detecting the second edge swipe. In some embodiments, the first set of user fingers and the second set of user fingers include different quantities of user fingers.

In additional or alternative embodiments, the first object includes a single applet and the second object includes an entire content being displayed on the first touch screen. In some embodiments, detecting the first edge swipe performed by the first set of user fingers includes detecting the first edge swipe performed by a single user finger or a pair of fingers and detecting the second edge swipe performed by the second set of user fingers includes detecting the second edge swipe performed by a different one of the single user finger and the pair of user fingers. In further embodiments, the first touch screen is a main display or a sub-display and the second touch screen is a different one of the main display and the sub-display than the first touch screen.

In one embodiment, a program product includes a computer-readable storage medium that stores code executable by a processor. The executable code, in certain embodiments, includes code to perform detecting, by an information handling device, detecting a first edge swipe performed by a first set of user fingers on a first object on a first touch screen of a computing device. The executable code, in various embodiments, further includes code to perform moving the first object from the first touch screen to a second touch screen of the computing device in response to detecting the first edge swipe.

In some embodiments, the first object includes a single applet or the entire content being displayed on the first touch screen. In further embodiments, detecting the first edge swipe performed by the first set of user fingers includes detecting the first edge swipe performed by a single user finger or a pair of user fingers for the single applet a different one of the single user finger and the pair of user fingers for the entire content being displayed on the first touch screen. In additional embodiments, the first touch screen is a main display or a sub-display and the second touch screen is a different one of the main display and the sub-display than the first touch screen In various embodiments, the executable code further includes code to perform detecting a second edge swipe performed by a second set of user fingers on a second object on the first touch screen and moving the second object from the first touch screen to the second touch screen in response to detecting the second edge swipe. In some embodiments, the first set of user fingers and the second set of user fingers include different quantities of user fingers.

In additional or alternative embodiments, the first object includes a single applet and the second object comprises an entire content being displayed on the first touch screen. In some embodiments, detecting the first edge swipe performed by the first set of user fingers includes detecting the first edge swipe performed by a single user finger or a pair of fingers and detecting the second edge swipe performed by the second set of user fingers includes detecting the second edge swipe performed by a different one of the single user finger and the pair of user fingers. In further embodiments, the first touch screen is a main display or a sub-display and the second touch screen is a different one of the main display and the sub-display than the first touch screen.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
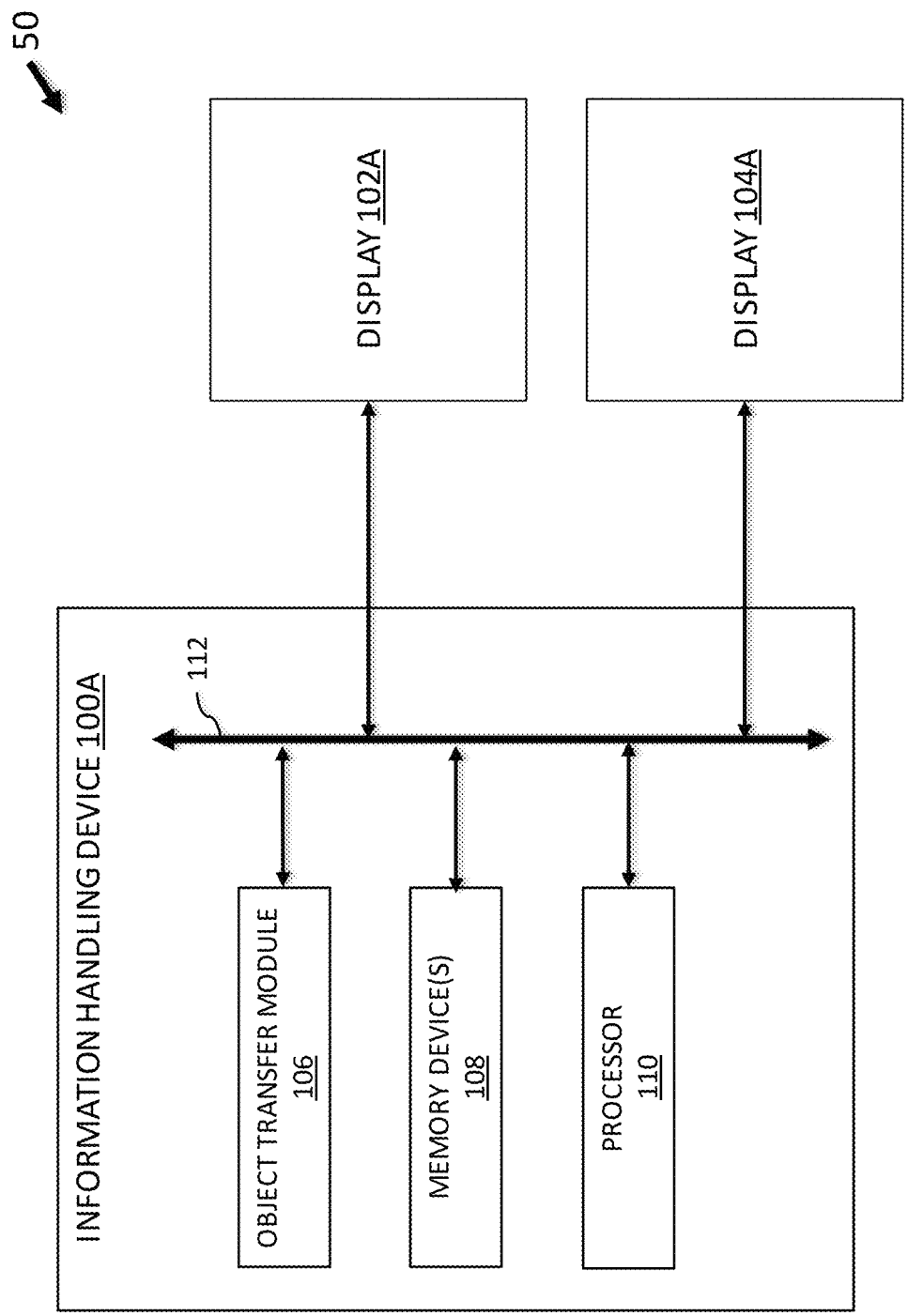
FIG. 1A is a schematic block diagram illustrating one embodiment of a computing system including an information handling device and a plurality of displays.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer-readable storage devices. Where a module or portions of a module are implemented in software, the software portions are stored on one or more computer-readable storage devices.

Any combination of one or more computer-readable medium may be utilized. The computer-readable medium may be a computer-readable storage medium. The computer-readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms a, an, and the also refer to one or more unless expressly specified otherwise.

In addition, as used herein, the term set can mean one or more, unless expressly specified otherwise. The term sets can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram of one embodiment of a computing system 50. At least in the illustrated embodiment, the computing system 50 includes two or more displays (e.g., a display 102A and a display 104A, etc.) coupled to and/or in communication with an information handling device 100A.

A display 102A may include any suitable hardware and/or software that can display digital information (e.g., one or more objects) thereon. An object can include one or more applets and/or icons, which can further include the entire contents displayed on the display 102A.

In some embodiments, the display 102A includes a touch screen that can receive one or more inputs from a user via the user's fingers and/or a stylus, which is referred to herein as an edge swipe. An edge swipe, in various embodiments, is a single-finger user input received by the display 102A. In additional or alternative embodiments, an edge swipe is a multi-finger user input received by the display 102A. In some embodiments, the multi-finger user input is a two-finger user input, among other quantities of user fingers greater than two fingers that are possible and contemplated herein.

In various embodiments, the display 102A includes functionality to transfer and/or move the object(s) displayed thereon to the one or more other displays (e.g., display 104A, etc.) via an edge swipe, as discussed elsewhere herein. In additional or alternative embodiments, the display 102A includes functionality to receive one or more object(s) from the display(s) (e.g., display 104A, etc.) and display the received object(s) thereon.

In further additional or alternative embodiments, the display 102A includes functionality to transfer and/or move all of the object(s) and/or the entire contents displayed thereon to the one or more other displays (e.g., display 104A, etc.) via an edge swipe performed by a set of user fingers, as discussed elsewhere herein. In additional or alternative embodiments, the display 102A includes functionality to receive all of the object(s) and/or the entire contents displayed on the display 104A from the display(s) (e.g., display 104A, etc.) and display all of the received object(s) and/or the entire content thereon.

A display 104A may include any suitable hardware and/or software that can display digital information (e.g., one or more objects) thereon. An object can include one or more applets and/or icons, which can further include the entire contents displayed on the display 104A.

In some embodiments, the display 104A includes a touch screen that can receive one or more inputs from a user via the user's fingers and/or a stylus, which is referred to herein as an edge swipe. An edge swipe, in various embodiments, is a single-finger user input received by the display 104A. In additional or alternative embodiments, an edge swipe is a multi-finger user input received by the display 104A. In some embodiments, the multi-finger user input is a two-finger user input, among other quantities of user fingers greater than two fingers that are possible and contemplated herein.

In various embodiments, the display 104A includes functionality to transfer and/or move the object(s) displayed thereon to the one or more other displays (e.g., display 102A, etc.) via an edge swipe, as discussed elsewhere herein. In additional or alternative embodiments, the display 104A includes functionality to receive one or more object(s) from the display(s) (e.g., display 102A, etc.) and display the received object(s) thereon.

In further additional or alternative embodiments, the display 104A includes functionality to transfer and/or move all of the object(s) and/or the entire contents displayed thereon to the one or more other displays (e.g., display 102A, etc.) via an edge swipe performed by a set of user fingers, as discussed elsewhere herein. In additional or alternative embodiments, the display 104A includes functionality to receive all of the object(s) and/or the entire contents displayed on the display 102A from the display(s) (e.g., display 102A, etc.) and display all of the received object(s) and/or the entire content thereon.

The information handling device 100A may include any suitable computing device that is known or developed in the future. In various embodiments, the information handling device 100A can include a desktop computer, a laptop computer, a personal digital assistant (PDA), a tablet computer, a smart phone, a cellular telephone, a smart television (e.g., televisions connected to the Internet), a set-top box, a game console, a vehicle on-board computer, a streaming device, a smart device, and a digital assistant, etc., among other computing devices that can utilize two or more displays (e.g., displays 102A and 104A, etc.) that are possible and contemplated herein. In some embodiments, an information handling device 100A can include a wearable device, such as a smart watch, a fitness band, or an optical head-mounted display, etc., among other wearable devices that are possible and contemplated herein.

At least in the illustrated embodiment, an information handling device 100A includes, among other components, an object transfer module 106, a set of memory devices 108, and a processor 110 coupled to and/or in communication with one another via a bus 112 (e.g., a wired and/or wireless bus 112).

An object transfer module 106 can include any suitable hardware and/or software that can transfer and/or move one or more objects between displays 102A and 104A. Specifically, the object transfer module 106 can transfer/move one or more objects displayed on the display 102A to the display 104A for display thereon and/or transfer/move one or more objects displayed on the display 104A to the display 102A for display thereon.

Further, the object transfer module 106 can transfer and/or move the entire contents displays between displays 102A and 104A. Specifically, the object transfer module 106 can transfer/move the entire contents displayed on the display 102A (e.g., all of the objects displayed on the display 102A) to the display 104A for display thereon and/or transfer/move the entire contents displayed on the display 104A to the display 102A for display thereon.

Figure 2:
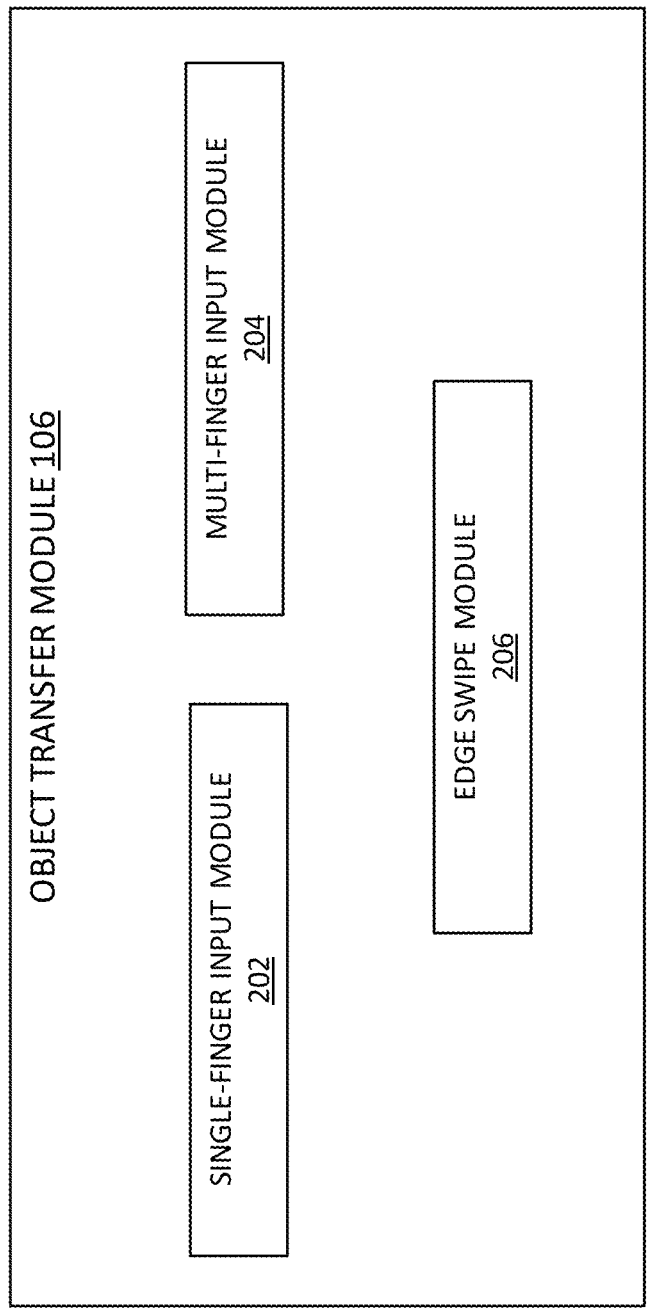
FIG. 2 is a schematic block diagram illustrating one embodiment of an object transfer module included in the information handling devices of FIGS. 1A through 1C.

With reference to FIG. 2, FIG. 2 is a block diagram of one embodiment of an object transfer module 106. At least in the illustrated embodiment, the object transfer module 106 includes, among other components, a single-finger input module 202, a multi-finger input module 204, and an edge swipe module 206.

A single-finger input module 202 can include any suitable hardware and/or software that can detect a single-finger edge swipe received by a touch screen of a display. In some embodiments, the single-finger input module 202 can detect a single-finger edge swipe received by the touch screen of multiple displays (e.g., displays 102A and 104A, etc.).

A multi-finger input module 204 can include any suitable hardware and/or software that can detect a multi-finger edge swipe received by a touch screen of a display. In some embodiments, the multi-finger input module 204 can detect a multi-finger edge swipe received by the touch screen of multiple displays (e.g., displays 102A and 104A, etc.).

An edge swipe module 206 may include any suitable hardware and/or software that can transfer/move the object(s) between the displays 102A and 104A in response to receiving an edge swipe from a set of user fingers and/or stylus. An edge swipe can include an input received via one or more user fingers (or stylus) touching the edge or border of an object or screen and/or touching an area of the object/screen proximate or near the edge or border of the object/screen and moving the user finger(s) toward the center of the object and/or screen.

In some embodiments, the edge swipe includes a single-finger user input (e.g., a single-finger edge swipe). In additional or alternative embodiments, the edge swipe includes a multi-finger user input (e.g., a two-finger edge swipe, three-finger edge swipe, a four-finger edge swipe, etc.).

In various embodiments, the edge swipe module 206 transfers a single object or applet from the display 102A to the display 104A in response to receiving a single-finger edge swipe. In additional or alternative embodiments, the edge swipe module 206 transfers a single object or applet from the display 104A to the display 102A in response to receiving a single-finger edge swipe.

In further additional or alternative embodiments, the edge swipe module 206 transfers a single object or applet from the display 102A to the display 104A in response to receiving a multi-finger edge swipe (e.g., a two-finger edge swipe, etc.). In still further additional or alternative embodiments, the edge swipe module 206 transfers a single object or applet from the display 104A to the display 102A in response to receiving a multi-finger edge swipe (e.g., a two-finger edge swipe, etc.).

In yet further additional or alternative embodiments, the edge swipe module 206 transfers multiple objects or the entire contents displayed on a screen from the display 102A to the display 104A in response to receiving a single-finger edge swipe. In yet still further additional or alternative embodiments, the edge swipe module 206 transfers multiple objects or the entire contents displayed on a screen from the display 104A to the display 102A in response to receiving a single-finger edge swipe.

In still further additional or alternative embodiments, the edge swipe module 206 transfers multiple objects or the entire contents displayed on a screen from the display 102A to the display 104A in response to receiving a multi-finger edge swipe (e.g., a two-finger edge swipe). In yet further additional or alternative embodiments, the edge swipe module 206 transfers multiple objects or the entire contents displayed on a screen from the display 104A to the display 102A in response to receiving a multi-finger edge swipe (e.g., a two-finger edge swipe).

In some embodiments, the edge swipe module 206 transfers display of a single object between displays 102A and 104A in response to receiving a single-finger edge swipe from a user and transfers display of multiple objects or the entire contents displayed thereon between displays 102A and 104A in response to receiving a multi-finger edge swipe (e.g., a two-finger swipe, etc.) from the user. That is, the edge swipe module 206 transfers a single object or applet from the display 102A to the display 104A and/or from the display 104A to the display 102A in response to receiving a single-finger edge swipe and transfers multiple objects or the entire contents displayed on the display 102A from the display 102A to the display 104A and/or multiple objects or the entire contents displayed on the display 104A from the display 104A to the display 102A in response to receiving a multi-finger edge swipe (e.g., a two-finger edge swipe).

In alternative embodiments, the edge swipe module 206 transfers display of a single object between displays 102A and 104A in response to receiving a multi-finger edge swipe from a user (e.g., a two-finger edge swipe, etc.) and transfers display of multiple objects or the entire contents displayed thereon between displays 102A and 104A in response to receiving a single-finger edge swipe from the user. That is, the edge swipe module 206 transfers a single object or applet from the display 102A to the display 104A and/or from the display 104A to the display 102A in response to receiving a multi-finger edge swipe (e.g., a two-finger edge swipe, etc.) and transfers multiple objects or the entire contents displayed on the display 102A from the display 102A to the display 104A and/or multiple objects or the entire contents displayed on the display 104A from the display 104A to the display 102A in response to receiving a single-finger edge swipe.

Figure 3:
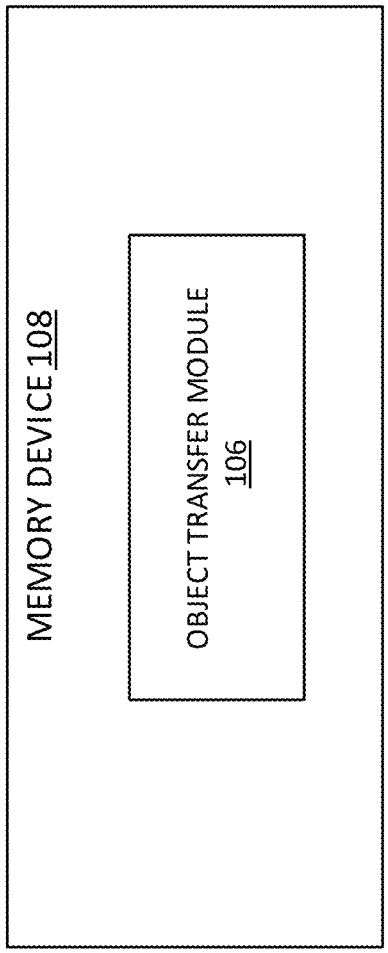
FIG. 3 is a schematic block diagram illustrating one embodiment of a memory device included in the information handling device of FIGS. 1A through 1C.

Referring to FIG. 3, FIG. 3 is a schematic block diagram illustrating one embodiment of at least one memory device 108 included in the set of memory devices 108 in the information handling device 100. The memory device 108 may include any suitable type of device and/or system that is known or developed in the future that can store computer-useable and/or computer-readable code. In various embodiments, a memory device 108 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In various embodiments, a memory device 108 includes volatile computer storage media. For example, a memory device 108 may include random access memory (RAM), including dynamic RAM (DRAM), synchronous dynamic RAM (SDRAM), and/or static RAM (SRAM). In some embodiments, a memory device 108 includes non-volatile computer storage media. For example, a memory device 108 may include a hard disk drive, a flash memory, and/or any other suitable non-volatile computer storage device that is known or developed in the future. In some embodiments, a memory device 108 includes both volatile and non-volatile computer storage media. In some embodiments, a memory device 108 also stores program code and/or related data, such as an operating system (OS) and/or other controller algorithms operating on an information handling device 100.

At least in the illustrated embodiment, the memory device 108 stores, among other data, an object transfer module 106 that is similar to the object transfer module 106 discussed elsewhere herein. The object transfer module 106 stored in the memory device 108 can be in addition to the object transfer module 106 in the information handling device 100 (e.g., a copy of the object transfer module 106) or in lieu of the object transfer module 106 in the information handling device 100.

Figure 4:
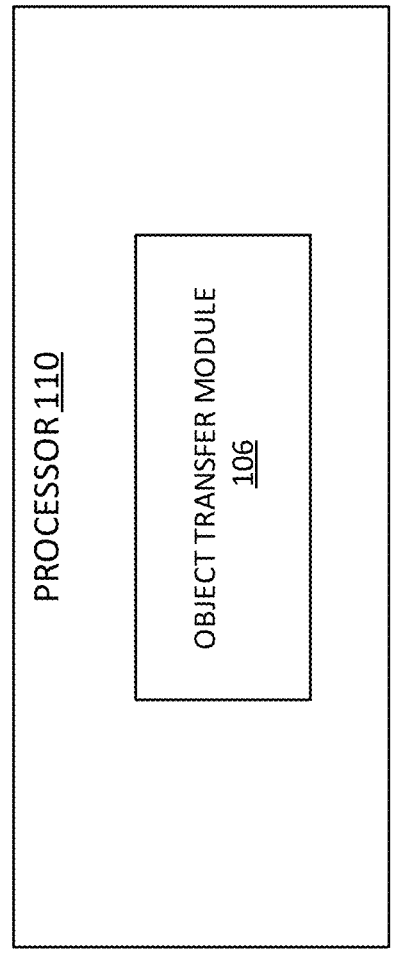
FIG. 4 is a schematic block diagram illustrating one embodiment of a processor included in the information handling device of FIGS. 1A through 1C.

With reference to FIG. 4, FIG. 4 is a schematic block diagram illustrating one embodiment of a processor 110 included in the information handling device 100. The processor 110 may include any suitable hardware and/or software that is known or developed in the future capable of executing code in an object transfer module 106.

At least in the illustrated embodiment, the processor 110 includes, among other components, an object transfer module 106 that is similar to the object transfer module 106 discussed elsewhere herein. The object transfer module 106 included in the processor 110 can be in addition to the object transfer module 106 in the information handling device 100 and/or the memory device(s) 108 (e.g., a copy of the object transfer module(s) 106) or in lieu of the object transfer module(s) 106 in the information handling device 100 and the memory device(s) 108.

In various embodiments, the processor 110 includes and/or forms at least a portion of a controller capable of executing computer-readable instructions and/or capable of performing logical operations. For example, the processor 110 may be a microcontroller, a microprocessor, a central processing unit (CPU), a graphics processing unit (GPU), an auxiliary processing unit, and/or a field programmable gate array (FPGA), etc., among other programmable controllers that are possible and contemplated herein. In some embodiments, the processor 110 includes firmware, hardware, and/or software that executes instructions in the code stored in the memory device(s) 108, information handling device 100, and/or processor 110 to perform the functions, operations, methods, and/or routines of the object transfer module(s) 106 included therein.

Figure 1B:
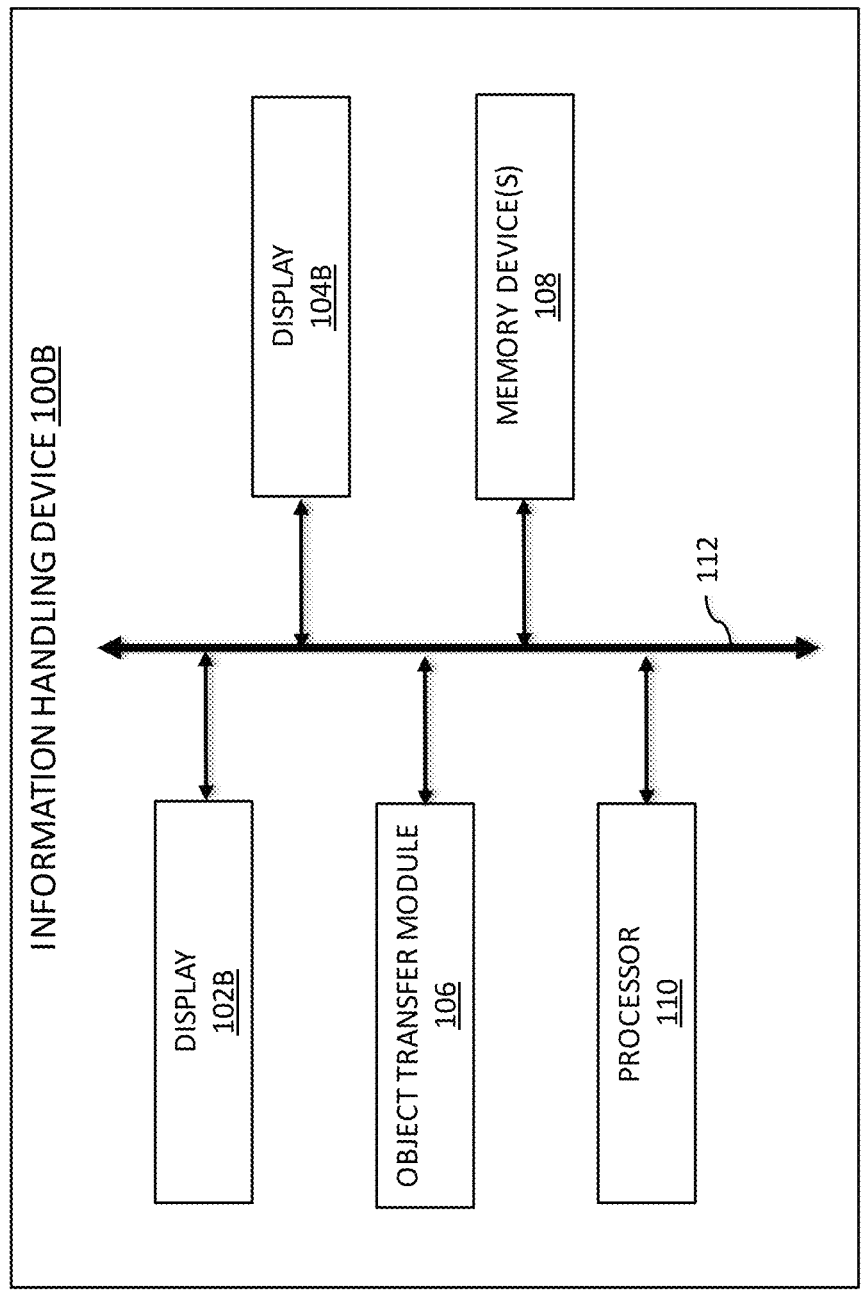
FIGS. 1B and 1C are schematic block diagrams illustrating various embodiments of an information handling device including a plurality of displays.

With reference to FIG. 1B, FIG. 1B is a schematic block diagram illustrating one embodiment of an information handling device 100B. At least in the illustrated embodiment, the information handling device 100B includes, among other components, a display 102B, a display 104B, an object transfer module 106, a set of memory devices 108, and a processor 110 coupled to and/or in communication with one another via a bus 114 (e.g., a wired and/or wireless bus 114).

The information handling device 100B may include any suitable computing device that is known or developed in the future. In various embodiments, the information handling device 100B can include a desktop computer, a laptop computer, a personal digital assistant (PDA), a tablet computer, a smart phone, a cellular telephone, a smart television (e.g., televisions connected to the Internet), a set-top box, a game console, a vehicle on-board computer, a streaming device, a smart device, and a digital assistant, etc., among other computing devices that can include two or more displays (e.g., displays 102B and 104B, etc.) that form at least a portion of the information handling device 100B that are possible and contemplated herein. In some embodiments, an information handling device 100B can include a wearable device, such as a smart watch, a fitness band, or an optical head-mounted display, etc., among other wearable devices that are possible and contemplated herein.

Displays 102B and 104B may be similar to the various embodiments of displays 102A and 104A, respectively, discussed elsewhere herein. Further, the object transfer module 106, the set of memory devices 108, and the processor 110 may be similar to the various embodiments of the object transfer module 106, the set of memory devices 108, and the processor 110, respectively, discussed elsewhere herein.

Figure 1C:
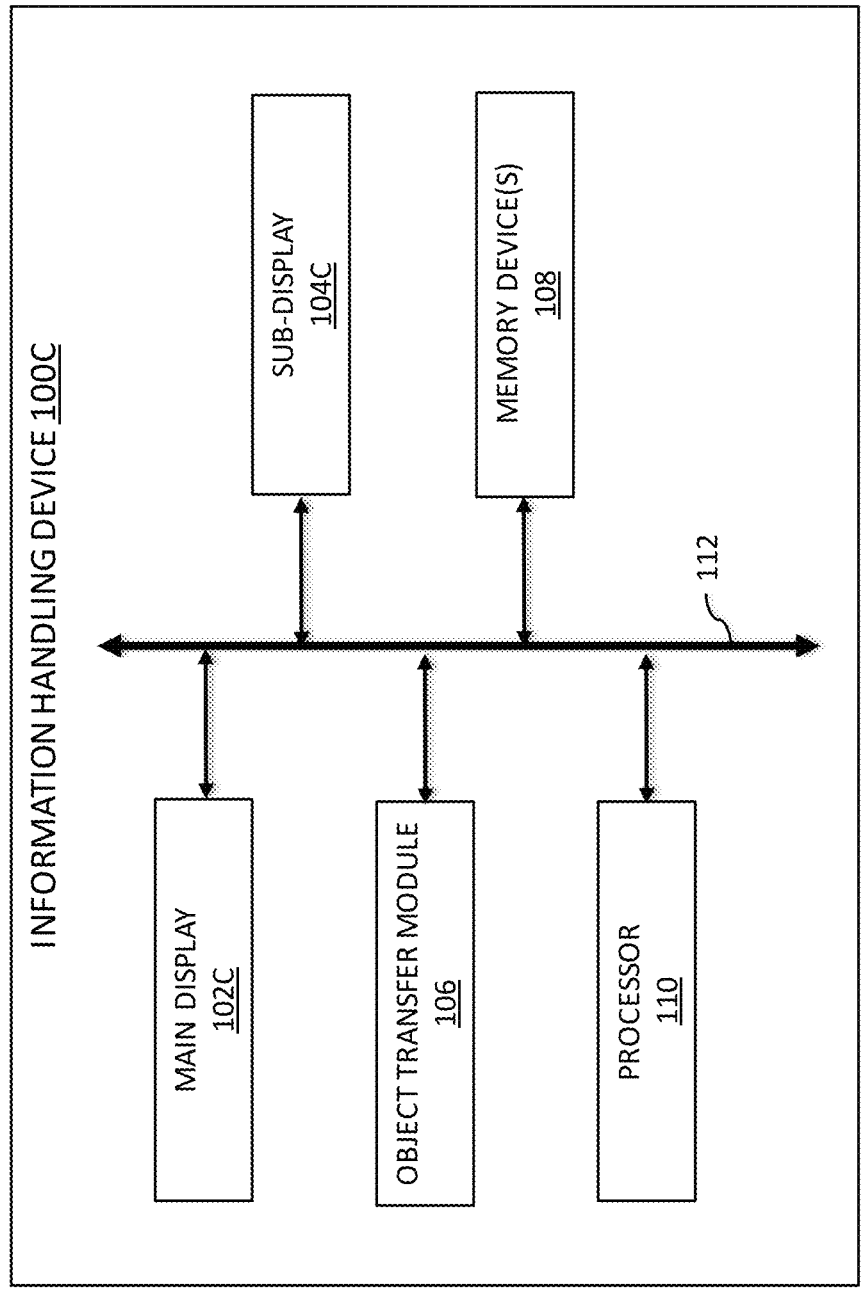

With reference to FIG. 1C, FIG. 1C is a schematic block diagram illustrating yet another embodiment of an information handling device 100B. At least in the illustrated embodiment, the information handling device 100C includes a display 102C, a display 104C, an object transfer module 106, a set of memory devices 108, and a processor 110 coupled to and/or in communication with one another via a bus 114 (e.g., a wired and/or wireless bus 114).

The information handling device 100C may include any suitable computing device that is known or developed in the future. In various embodiments, the information handling device 100C can include a desktop computer, a laptop computer, a personal digital assistant (PDA), a tablet computer, a smart phone, a cellular telephone, a smart television (e.g., televisions connected to the Internet), a set-top box, a game console, a vehicle on-board computer, a streaming device, a smart device, and a digital assistant, etc., among other computing devices that can include two or more displays (e.g., displays 102C and 104C, etc.) that form at least a portion of the information handling device 100C that are possible and contemplated herein. In some embodiments, an information handling device 100B can include a wearable device, such as a smart watch, a fitness band, or an optical head-mounted display, etc., among other wearable devices that are possible and contemplated herein.

Displays 102C and 104C may function and/or operate similar to the various embodiments of displays 102A and 104A, respectively, discussed elsewhere herein. In some embodiments, display 102C is a main display 102C and display 104C is a sub-display 104C that is smaller in size than the main display 102C. Further, the object transfer module 106, the set of memory devices 108, and the processor 110 may be similar to the various embodiments of the object transfer module 106, the set of memory devices 108, and the processor 110, respectively, discussed elsewhere herein.

FIGS. 5A through 5P are schematic diagrams illustrating various embodiments of transferring objects 502A through 502n (also simply referred individually, in various groups, or collectively as object(s) 502) between displays 102A and 104A and 102B and 104B. FIG. 5A illustrates vertically transferring/moving an object 502A on a screen 504A of a display 102A/102B to a screen 504B of a display 104A/104B via a single-finger edge swipe. FIG. 5B illustrates vertically transferring/moving a set of objects 502A through 502n on a screen 504A of a display 102A/102B to a display 104A/104B via a single-finger edge swipe so that the display 104A/104B includes the screen 504A and/or objects 502A through 502n.

Figure 5D:
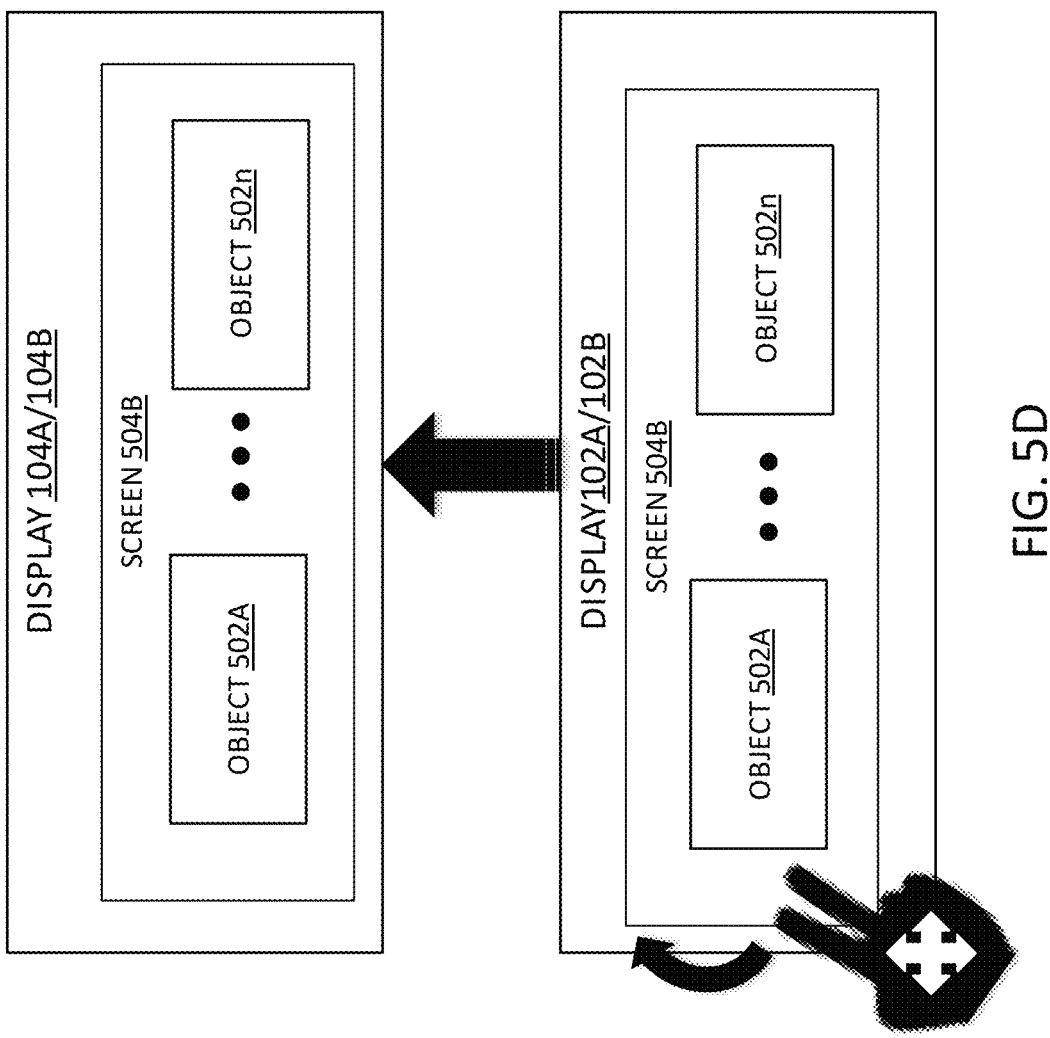
FIGS. 5A through 5P are schematic diagrams illustrating various embodiments of transferring objects between a plurality of displays.

FIG. 5C illustrates vertically transferring/moving an object 502A on a screen 504A of a display 102A/102B to a screen 504B of a display 104A/104B via a multi-finger edge swipe (e.g., a two-finger edge swipe). FIG. 5D illustrates vertically transferring/moving a set of objects 502A through 502n on a screen 504A of a display 102A/102B to a display 104A/104B via a multi-finger edge swipe so that the display 104A/104B includes the screen 504A and/or objects 502A through 502n.

Figure 5E:
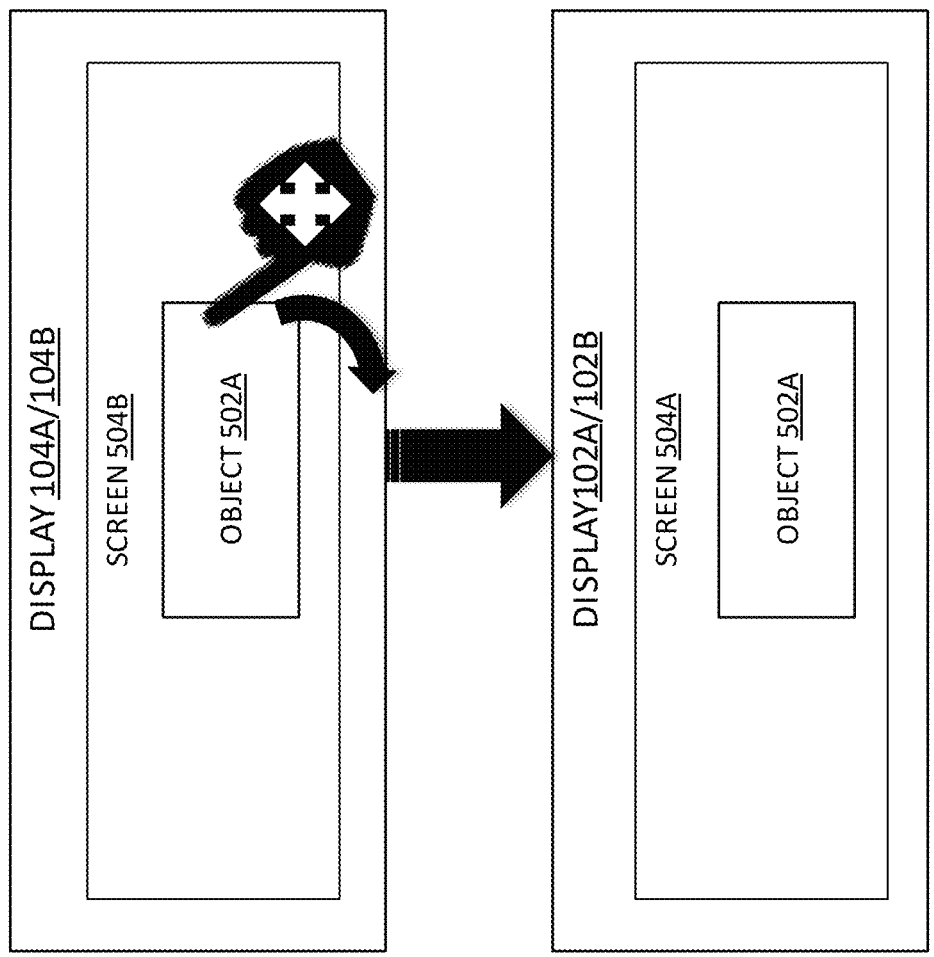
Figure 5F:
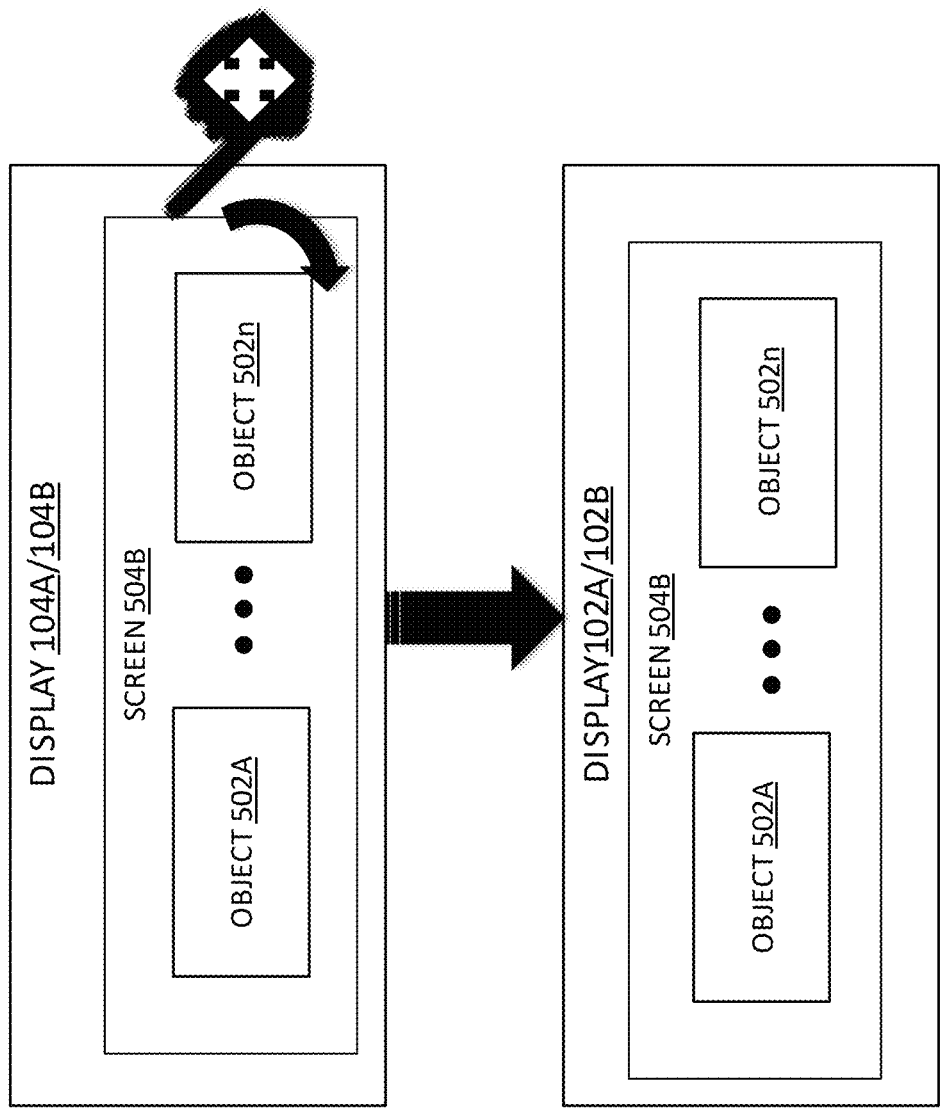

FIG. 5E illustrates vertically transferring/moving an object 502A on a screen 504B of a display 104A/104B to a screen 504A of a display 102A/102B via a single-finger edge swipe. FIG. 5F illustrates vertically transferring/moving a set of objects 502A through 502n on a screen 504B of a display 104A/104B to a display 102A/102B via a single-finger edge swipe so that the display 102A/102B includes the screen 504B and/or objects 502A through 502n.

Figure 5G:
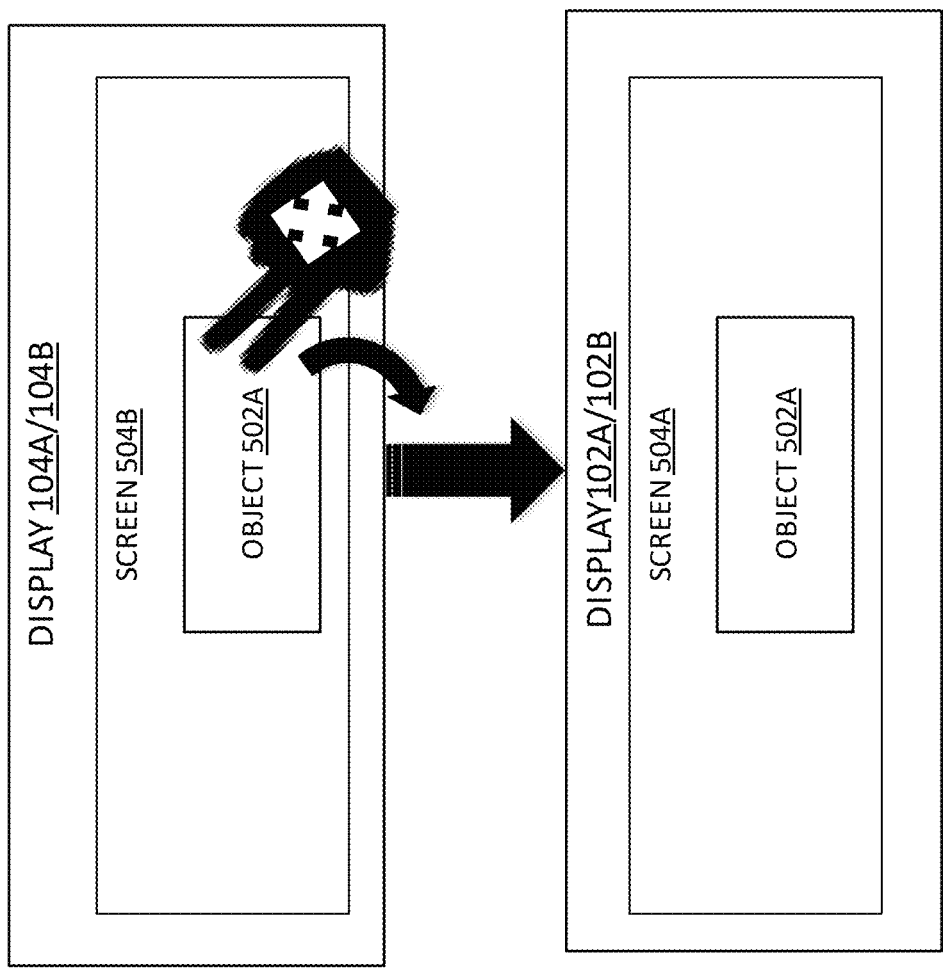
Figure 5H:
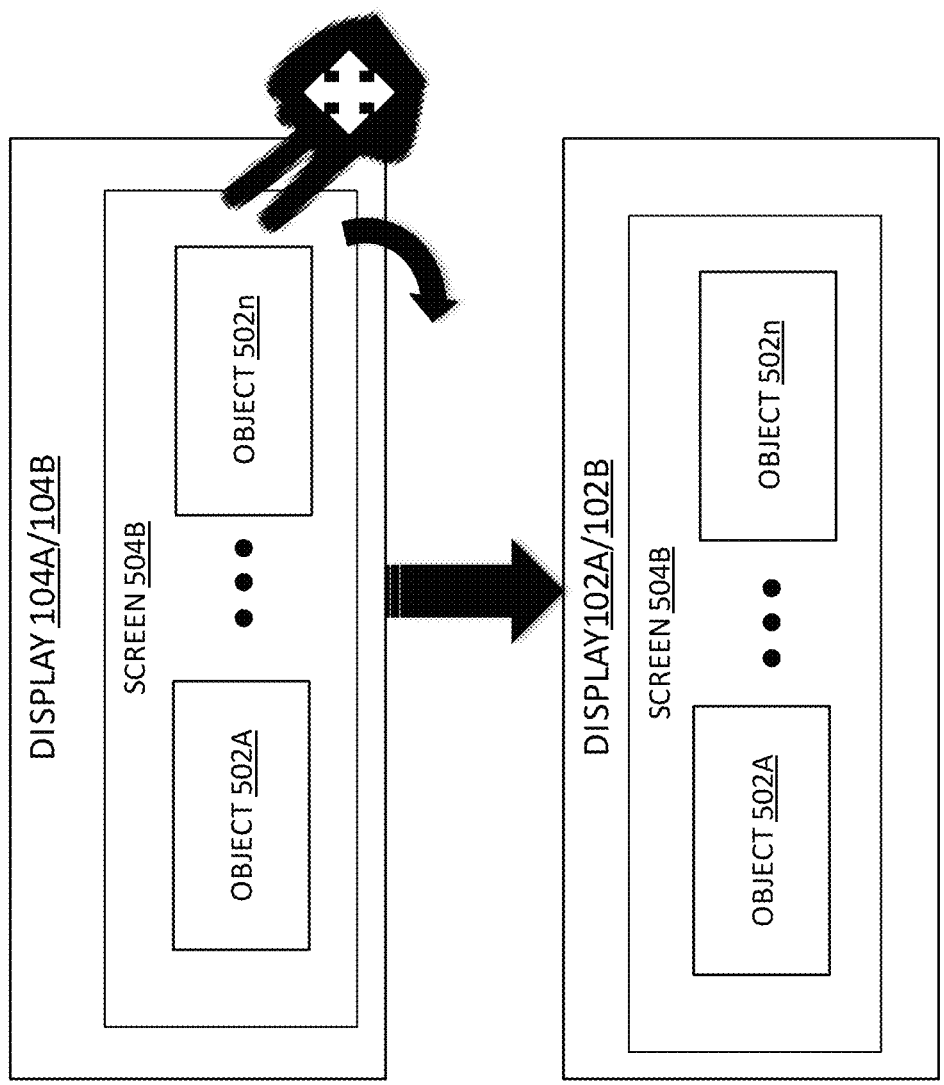

FIG. 5G illustrates vertically transferring/moving an object 502A on a screen 504B of a display 104A/104B to a screen 504A of a display 102A/102B via a multi-finger edge swipe. FIG. 5H illustrates vertically transferring/moving a set of objects 502A through 502n on a screen 504B of a display 104A/104B to a display 102A/102B via a multi-finger edge swipe so that the display 102A/102B includes the screen 504B and/or objects 502A through 502n.

Figure 5I:
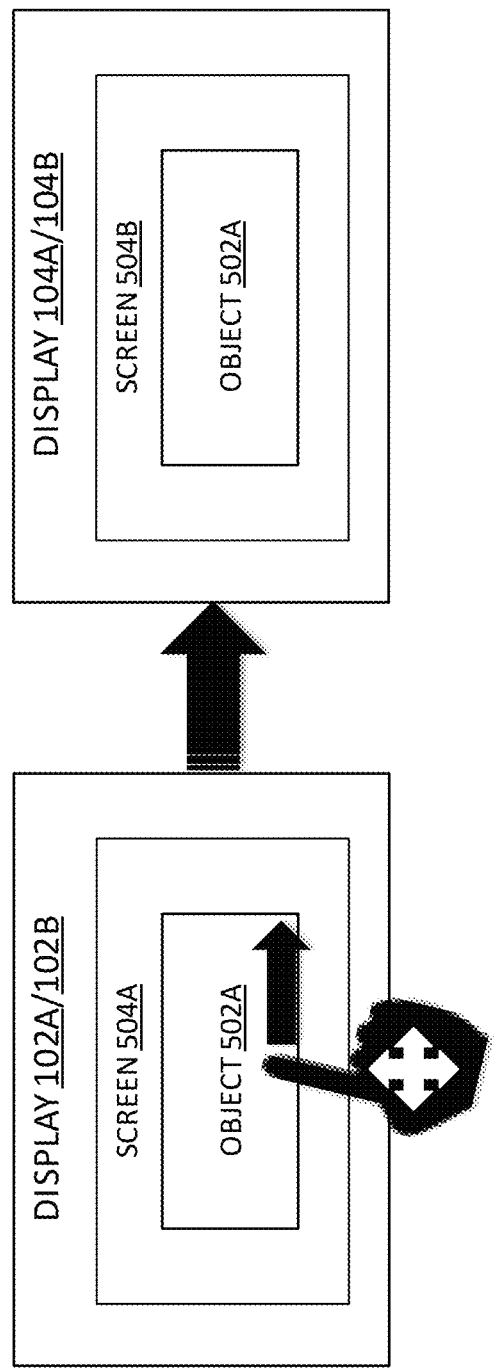
Figure 5J:
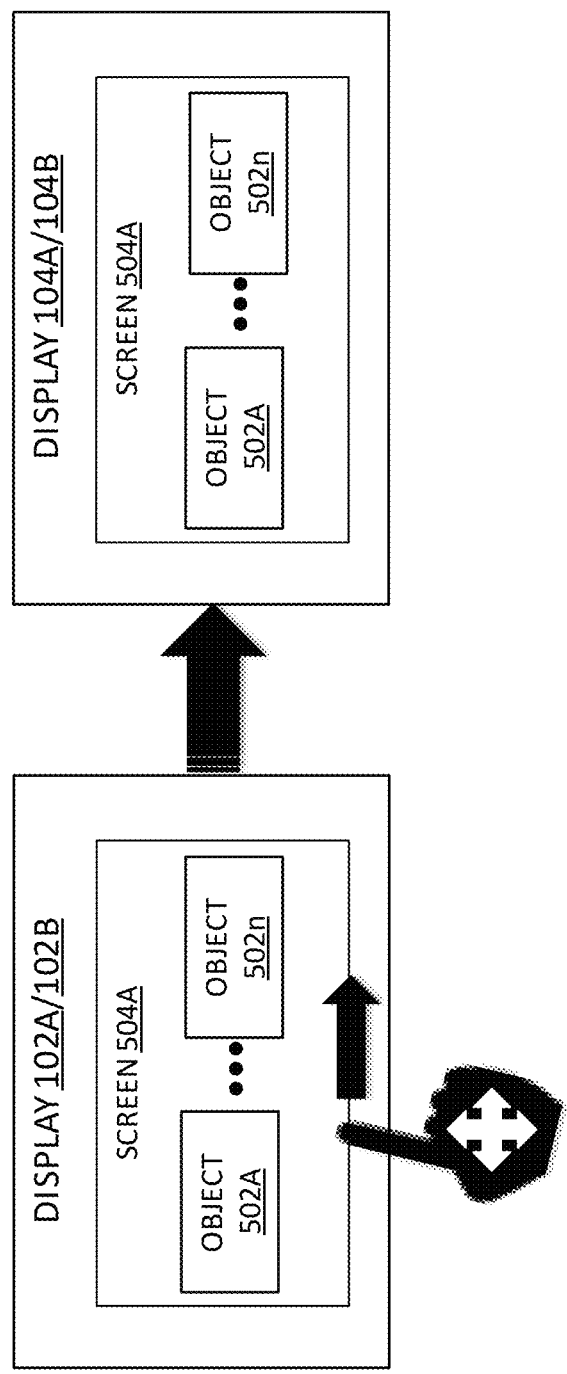

FIG. 5I illustrates horizontally transferring/moving an object 502A on a screen 504A of a display 102A/102B to a screen 504B of a display 104A/104B via a single-finger edge swipe. FIG. 5J illustrates horizontally transferring/moving a set of objects 502A through 502n on a screen 504A of a display 102A/102B to a display 104A/104B via a single-finger edge swipe so that the display 104A/104B includes the screen 504A and/or objects 502A through 502n.

Figure 5K:
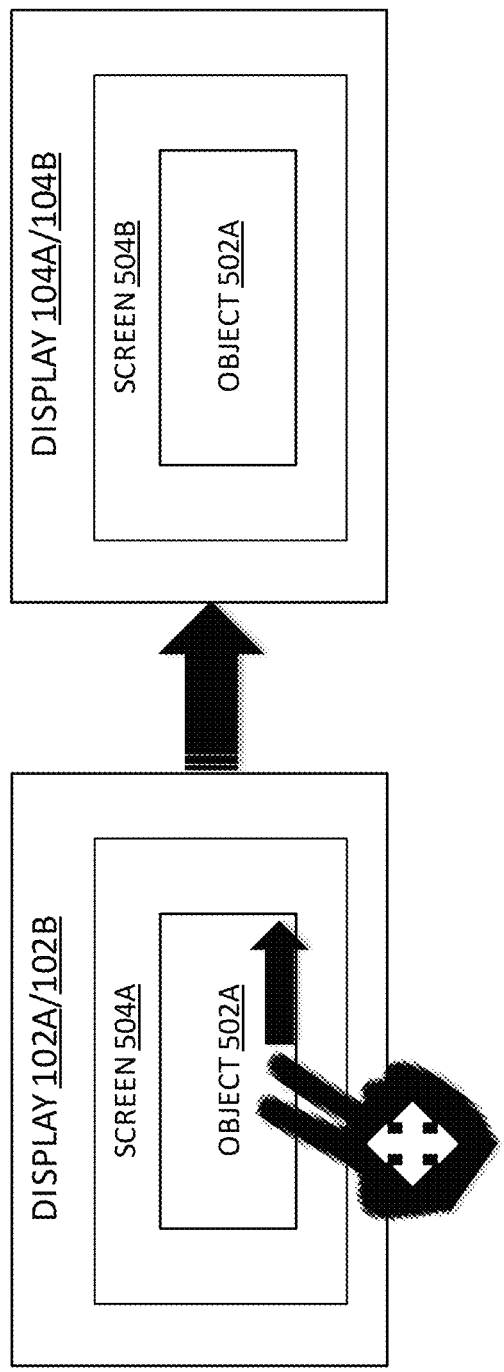
Figure 5L:
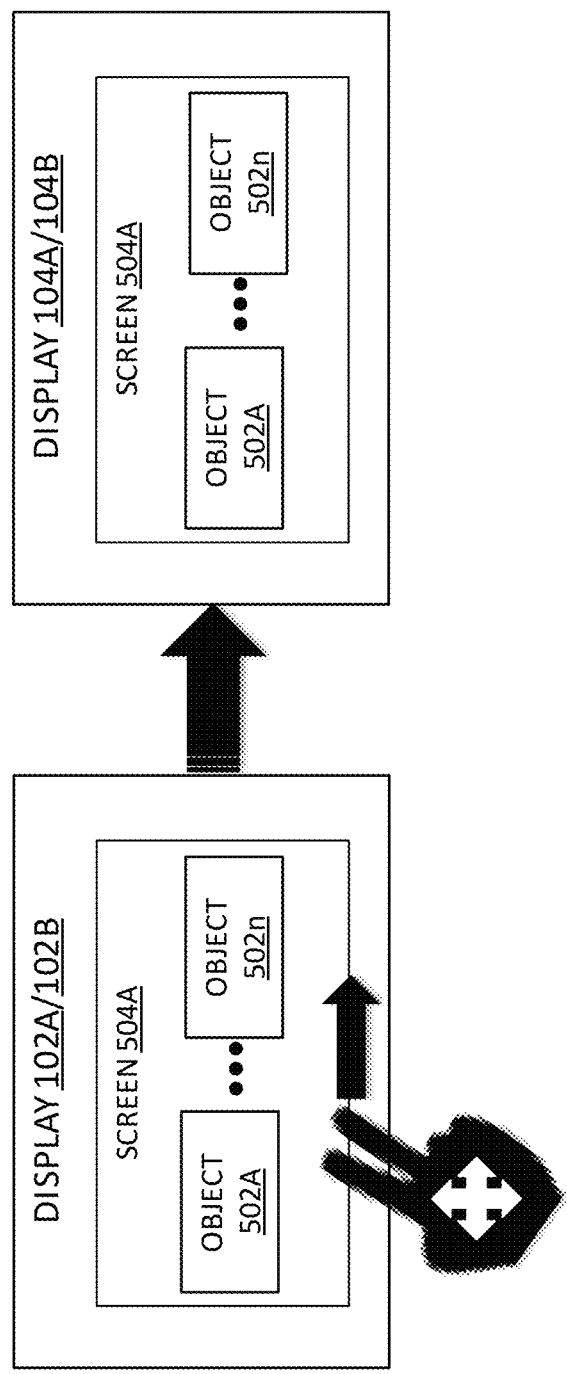

FIG. 5K illustrates horizontally transferring/moving an object 502A on a screen 504A of a display 102A/102B to a screen 504B of a display 104A/104B via a multi-finger edge swipe (e.g., a two-finger edge swipe). FIG. 5L illustrates horizontally transferring/moving a set of objects 502A through 502n on a screen 504A of a display 102A/102B to a display 104A/104B via a multi-finger edge swipe so that the display 104A/104B includes the screen 504A and/or objects 502A through 502n.

Figure 5N:
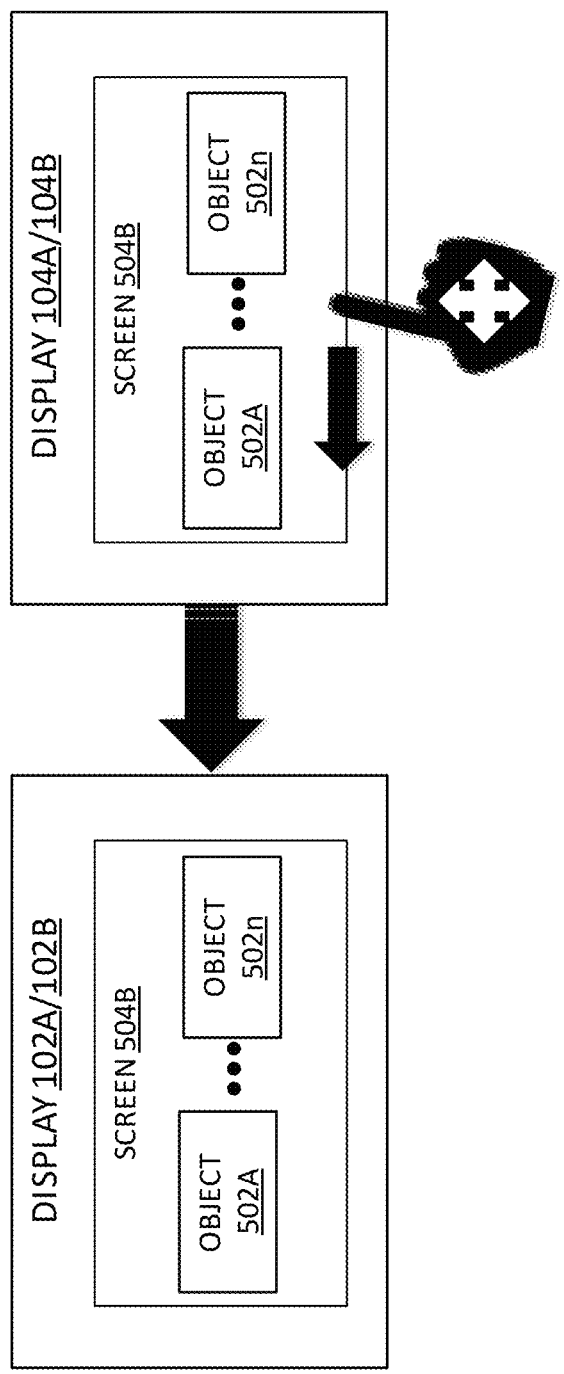

FIG. 5M illustrates horizontally transferring/moving an object 502A on a screen 504B of a display 104A/104B to a screen 504A of a display 102A/102B via a single-finger edge swipe. FIG. 5N illustrates horizontally transferring/moving a set of objects 502A through 502n on a screen 504B of a display 104A/104B to a display 102A/102B via a single-finger edge swipe so that the display 102A/102B includes the screen 504B and/or objects 502A through 502n.

FIG. 5O illustrates horizontally transferring/moving an object 502A on a screen 504B of a display 104A/104B to a screen 504A of a display 102A/102B via a multi-finger edge swipe. FIG. 5P illustrates horizontally transferring/moving a set of objects 502A through 502n on a screen 504B of a display 104A/104B to a display 102A/102B via a multi-finger edge swipe so that the display 102A/102B includes the screen 504B and/or objects 502A through 502n.

Figure 6B:
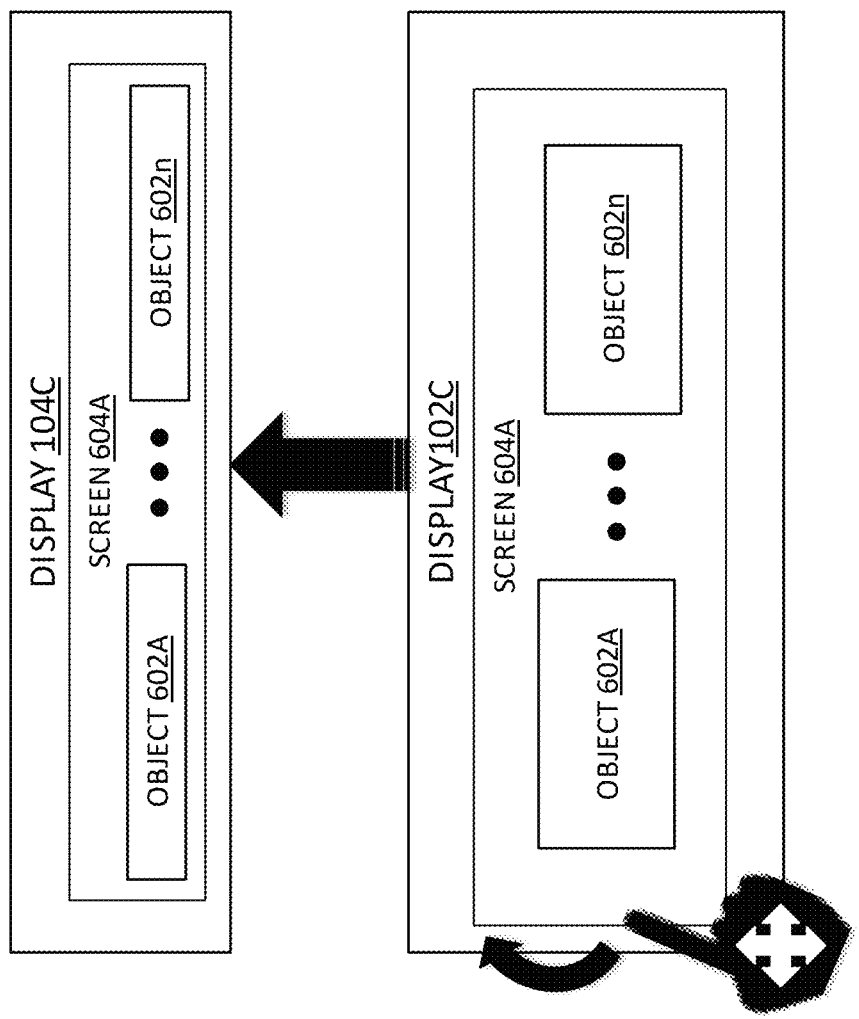
FIGS. 6A through 6P are schematic diagrams illustrating various embodiments of transferring objects between a plurality of displays.
Figure 6D:
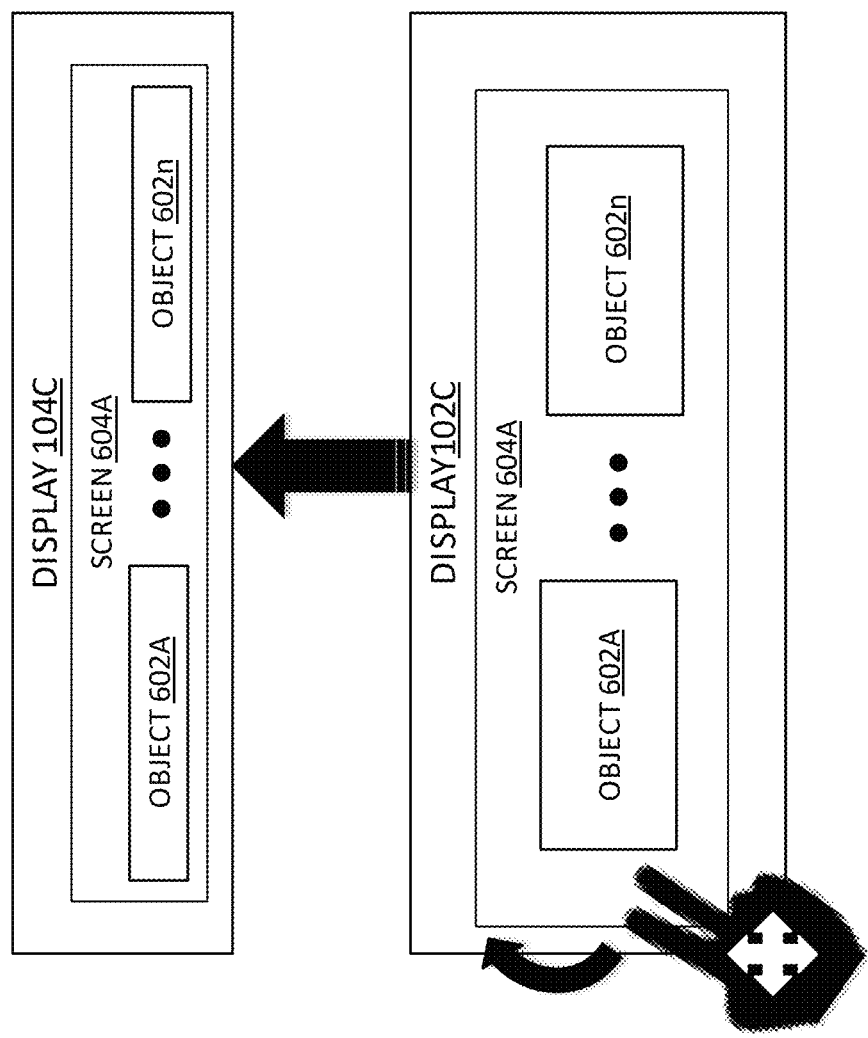
Figure 6E:
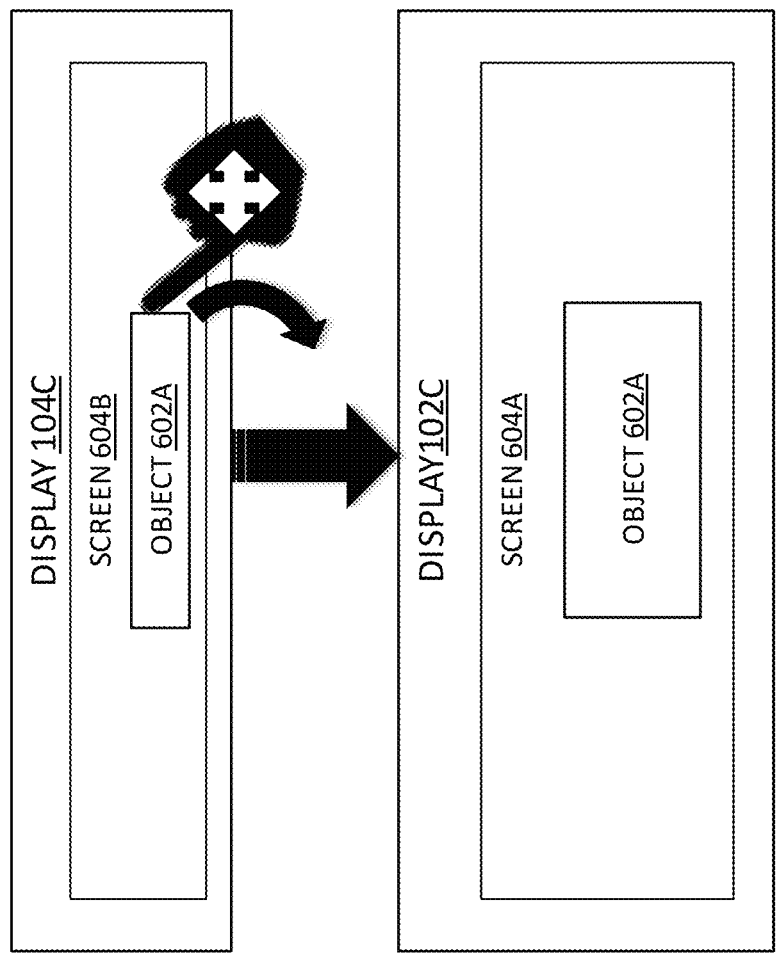
Figure 6F:
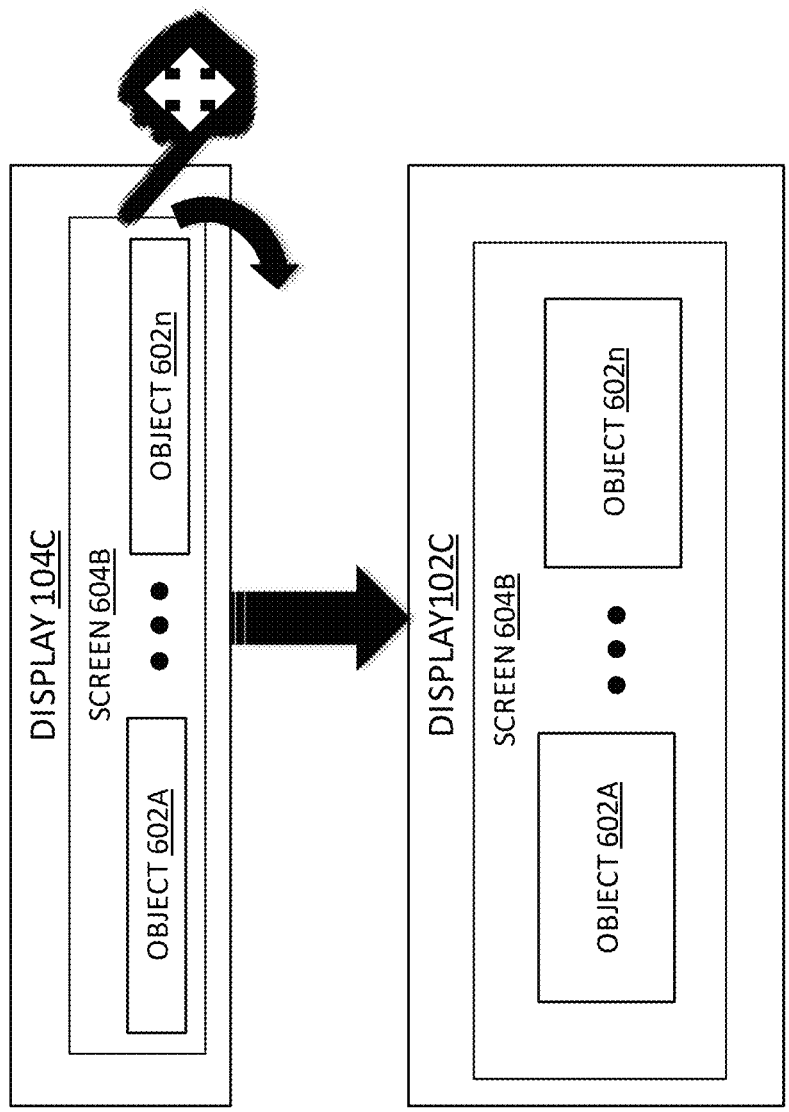
Figure 6G:
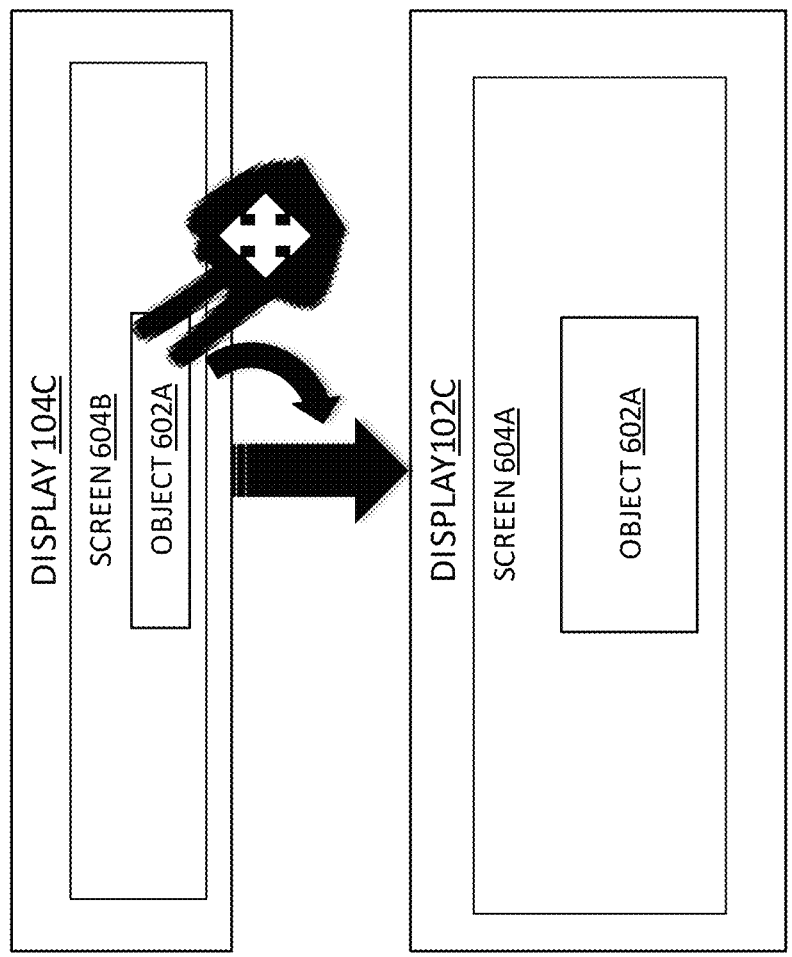
Figure 6H:
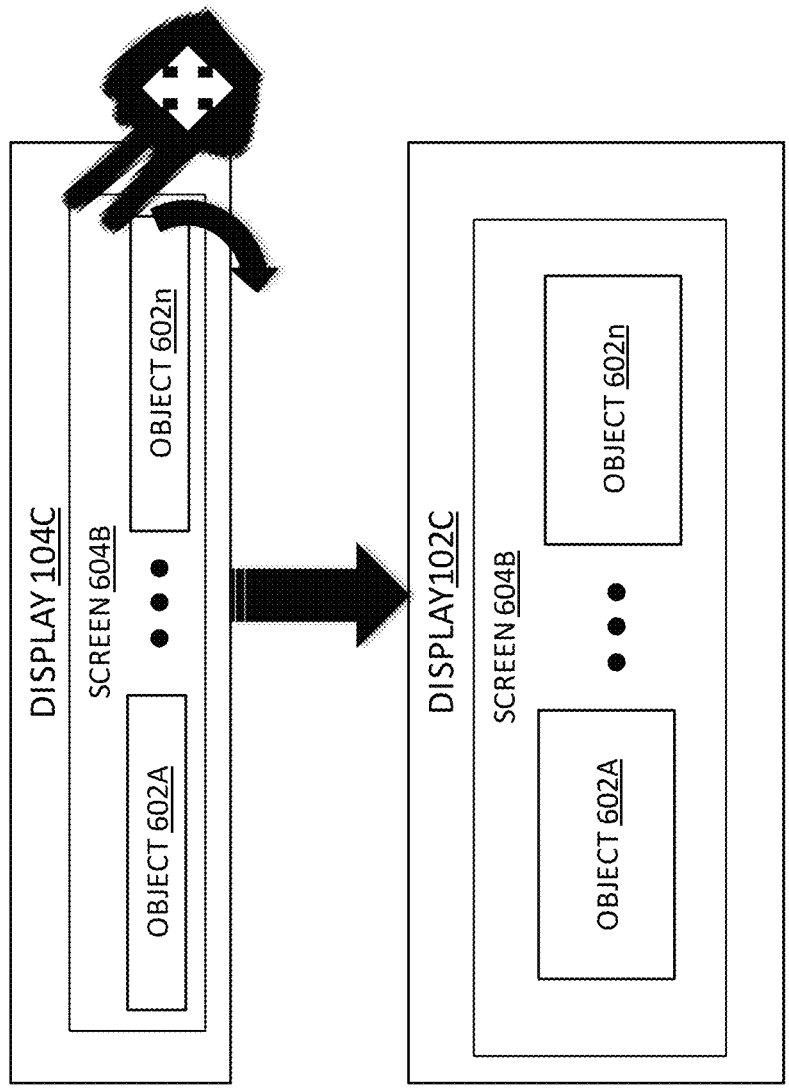
Figure 6J:
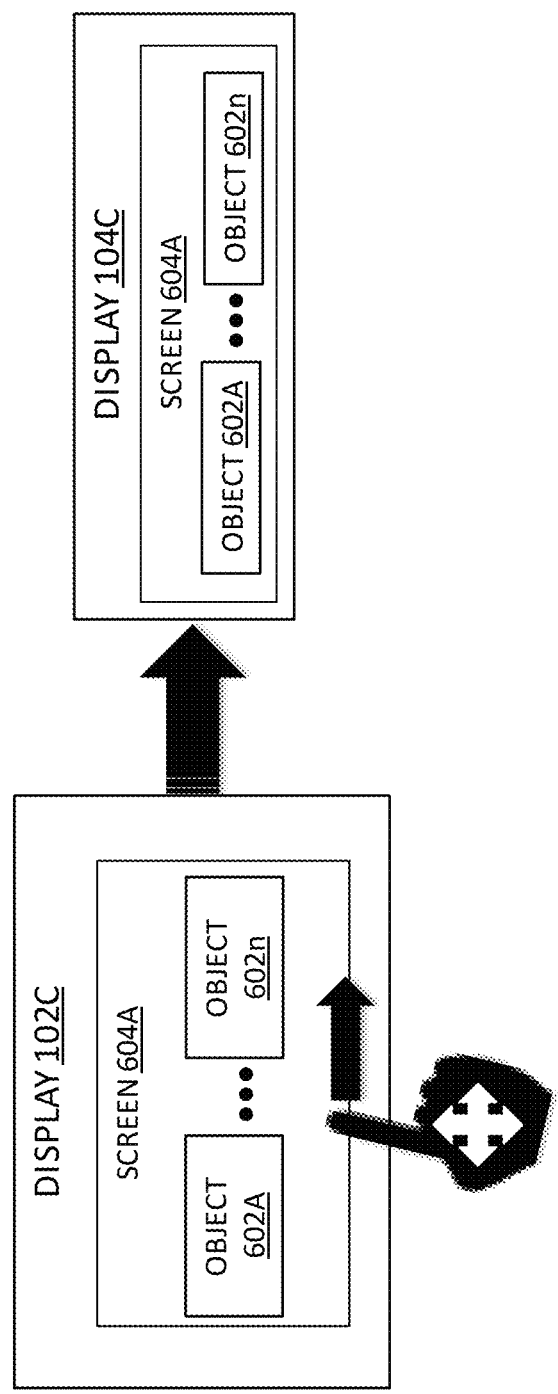
Figure 6K:
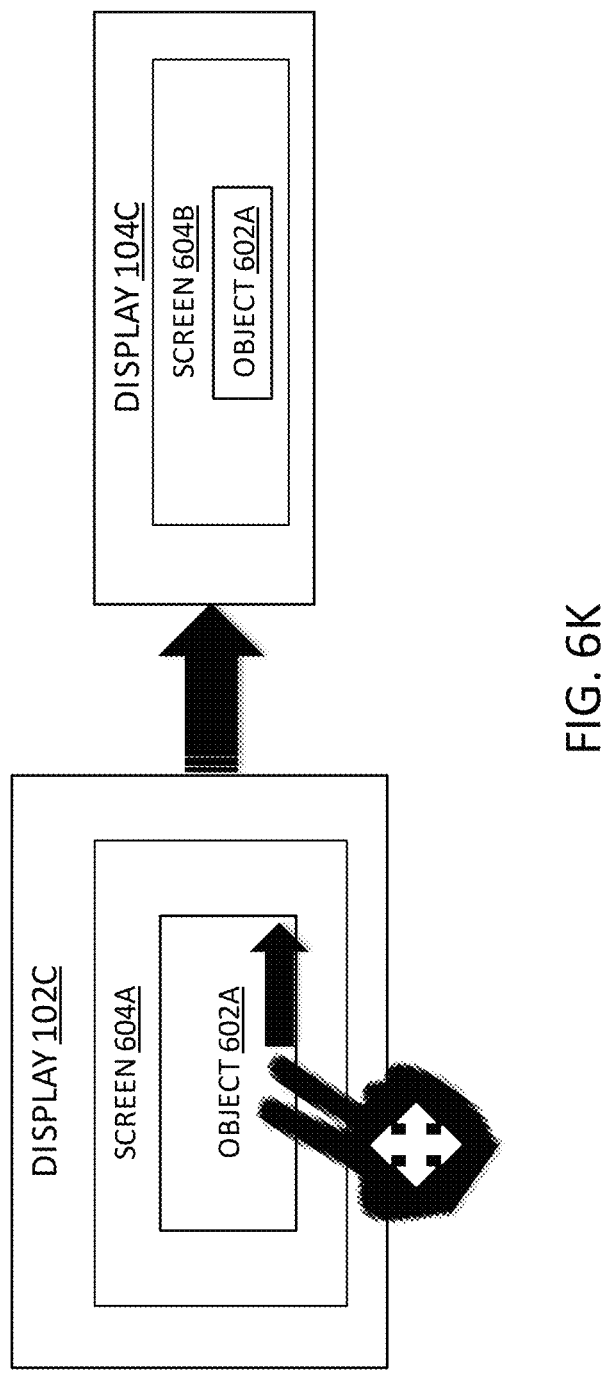
Figure 6L:
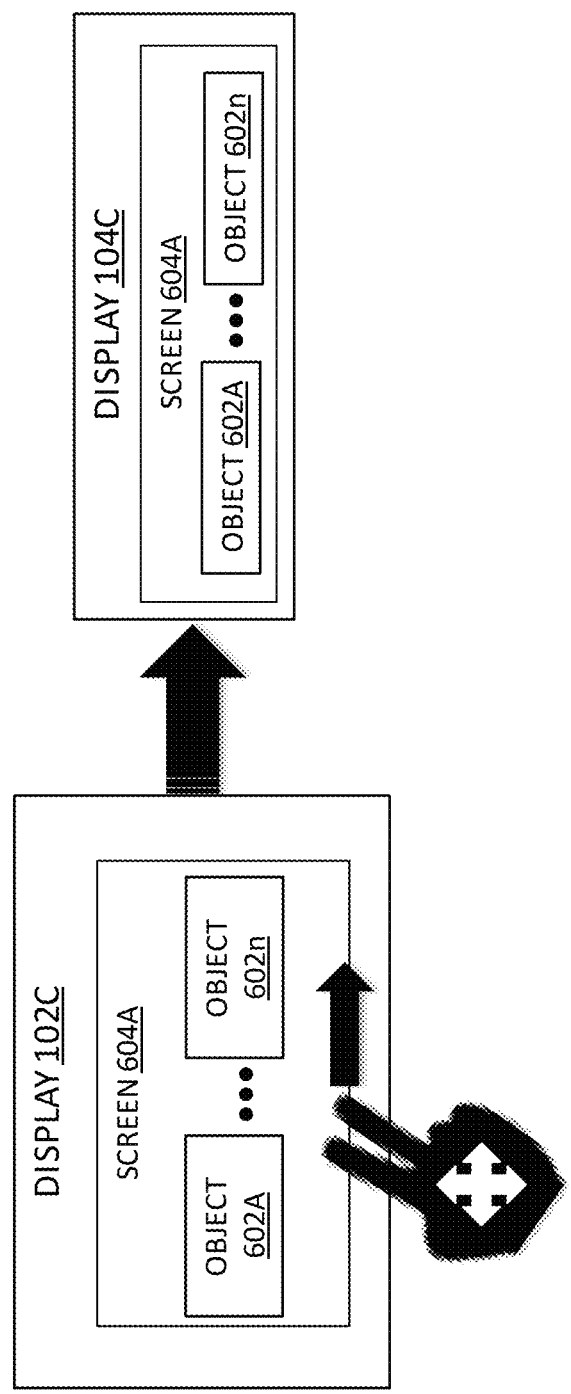
Figure 6M:
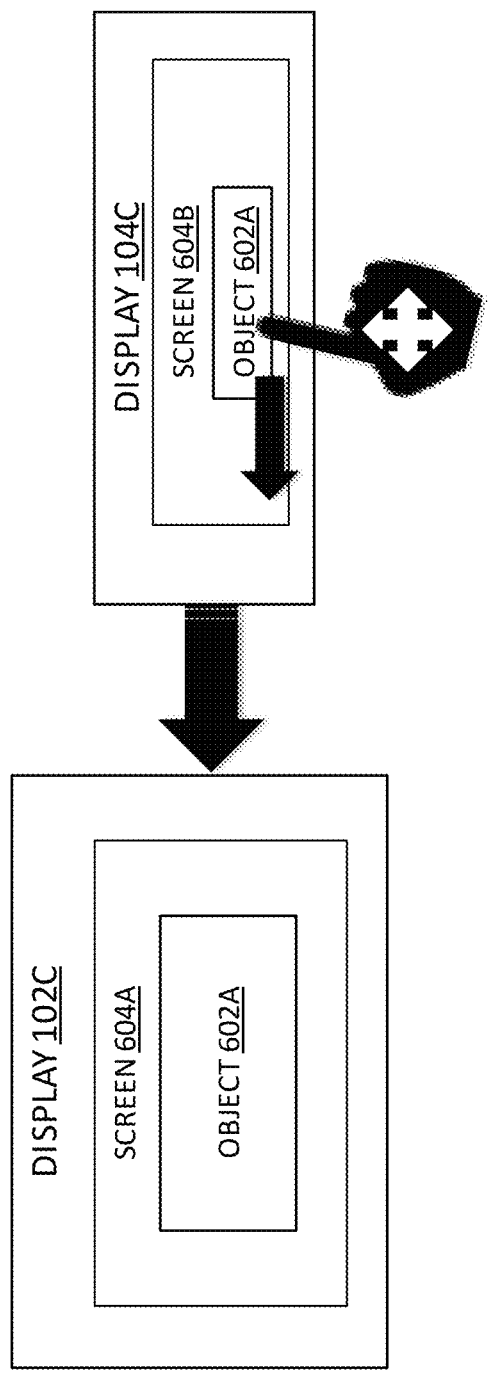
Figure 6N:
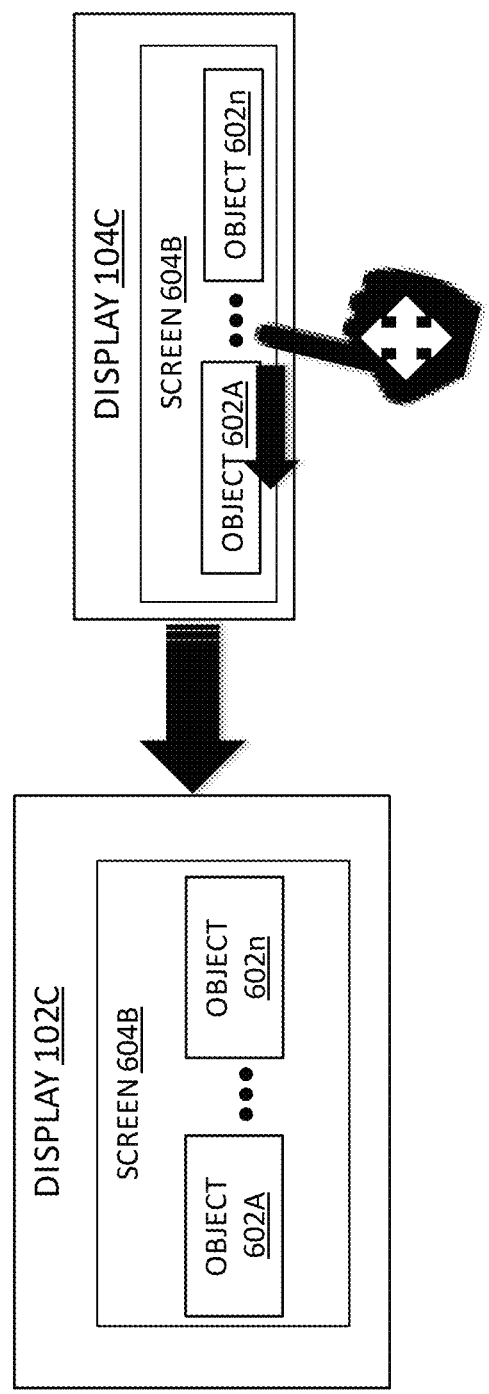
Figure 6O:
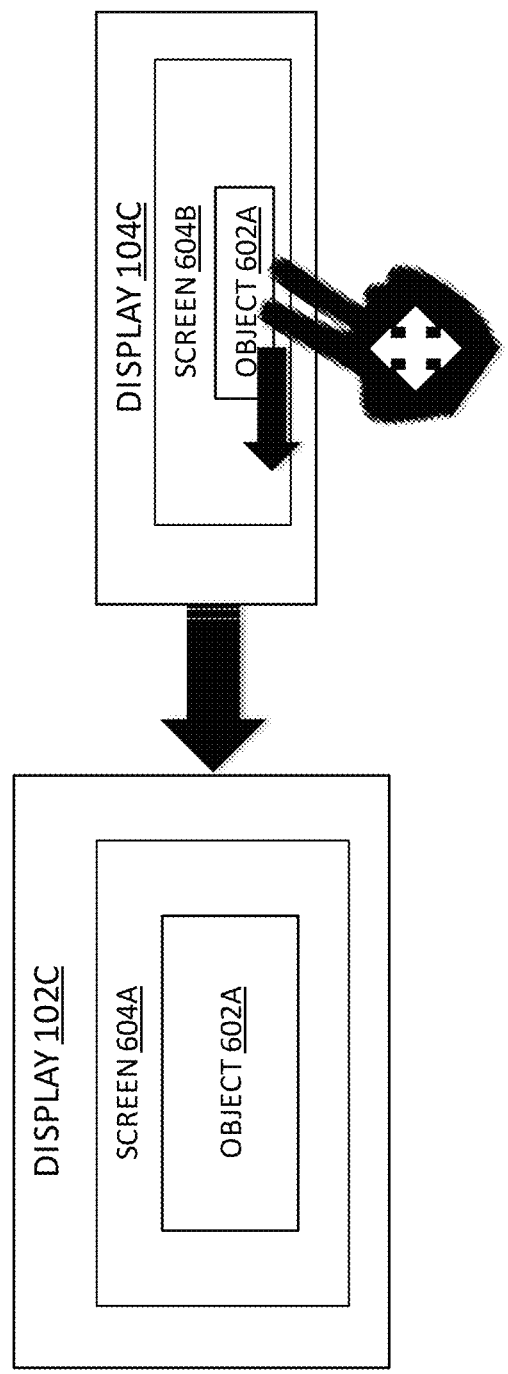
Figure 6P:
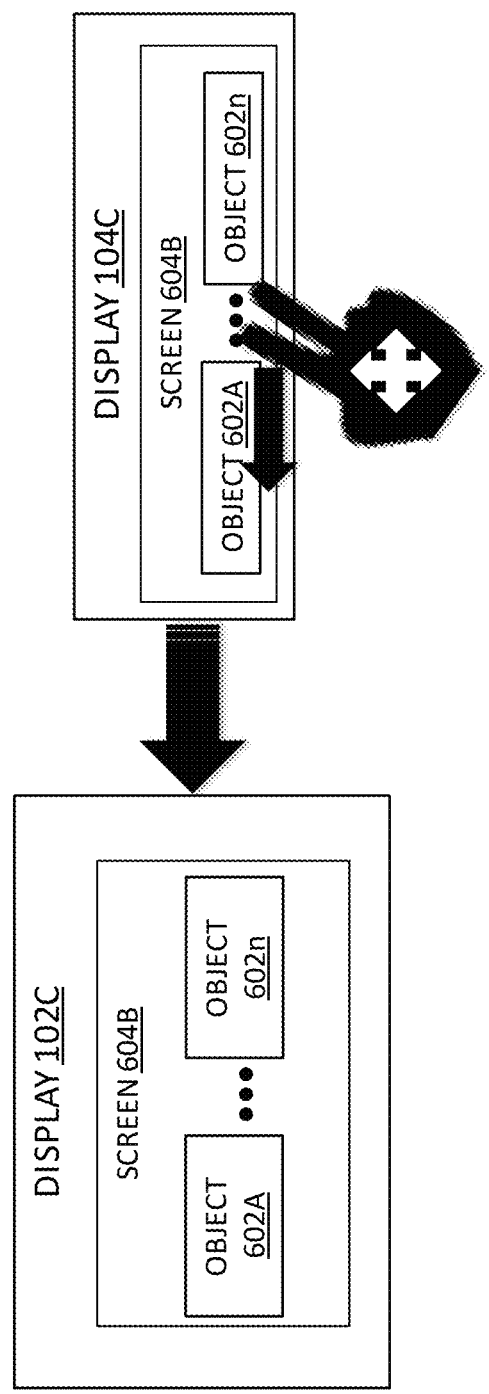

FIGS. 6A through 6P are schematic diagrams illustrating various embodiments of transferring objects 602A through 602n (also simply referred individually, in various groups, or collectively as object(s) 602) between displays 102C and 104C. As discussed elsewhere herein, display 102C can be a main display and display 104C can be a sub-display of an information handling device 100C.

FIG. 6A illustrates vertically transferring/moving an object 602A on a screen 604A of a display 102C to a screen 604B of a display 104C via a single-finger edge swipe. FIG. 6B illustrates vertically transferring/moving a set of objects 602A through 602n on a screen 604A of a display 102C to a display 104C via a single-finger edge swipe so that the display 104C includes the screen 604A and/or objects 602A through 602n.

FIG. 6C illustrates vertically transferring/moving an object 602A on a screen 604A of a display 102C to a screen 604B of a display 104C via a multi-finger edge swipe (e.g., a two-finger edge swipe). FIG. 6D illustrates vertically transferring/moving a set of objects 602A through 602n on a screen 604A of a display 102C to a display 104C via a multi-finger edge swipe so that the display 104C includes the screen 604A and/or objects 602A through 602n.

FIG. 6E illustrates vertically transferring/moving an object 602A on a screen 604B of a display 104C to a screen 604A of a display 102C via a single-finger edge swipe. FIG. 6F illustrates vertically transferring/moving a set of objects 602A through 602n on a screen 604B of a display 104C to a display 102C via a single-finger edge swipe so that the display 102C includes the screen 604B and/or objects 602A through 602n.

FIG. 6G illustrates vertically transferring/moving an object 602A on a screen 604B of a display 104C to a screen 604A of a display 102C via a multi-finger edge swipe. FIG. 6H illustrates vertically transferring/moving a set of objects 602A through 602n on a screen 604B of a display 104C to a display 102C via a multi-finger edge swipe so that the display 102C includes the screen 604B and/or objects 602A through 602n.

FIG. 6I illustrates horizontally transferring/moving an object 602A on a screen 604A of a display 102C to a screen 604B of a display 104C via a single-finger edge swipe. FIG. 6J illustrates horizontally transferring/moving a set of objects 602A through 602n on a screen 604A of a display 102C to a display 104C via a single-finger edge swipe so that the display 104C includes the screen 604A and/or objects 602A through 602n.

FIG. 6K illustrates horizontally transferring/moving an object 602A on a screen 604A of a display 102C to a screen 604B of a display 104C via a multi-finger edge swipe (e.g., a two-finger edge swipe). FIG. 6L illustrates horizontally transferring/moving a set of objects 602A through 602n on a screen 604A of a display 102C to a display 104C via a multi-finger edge swipe so that the display 104C includes the screen 604A and/or objects 602A through 602n.

FIG. 6M illustrates horizontally transferring/moving an object 602A on a screen 604B of a display 104C to a screen 604A of a display 102C via a single-finger edge swipe. FIG. 6N illustrates horizontally transferring/moving a set of objects 602A through 602n on a screen 604B of a display 104C to a display 102C via a single-finger edge swipe so that the display 102C includes the screen 604B and/or objects 602A through 602n.

FIG. 6O illustrates horizontally transferring/moving an object 602A on a screen 604B of a display 104C to a screen 604A of a display 102C via a multi-finger edge swipe. FIG. 6P illustrates horizontally transferring/moving a set of objects 602A through 602n on a screen 604B of a display 104C to a display 102C via a multi-finger edge swipe so that the display 102C includes the screen 604B and/or objects 602A through 602n.

Figure 7:
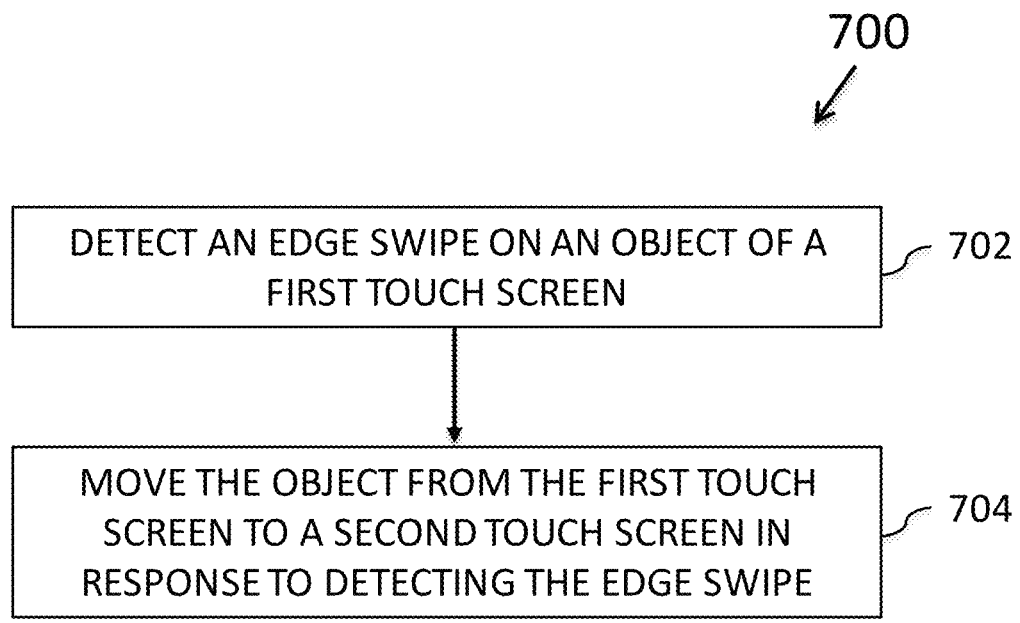
FIG. 7 is a schematic flow chart diagram illustrating one embodiment of a method for transferring objects between a plurality of displays.

FIG. 7 is a schematic flow chart diagram illustrating one embodiment of a method 700 for transferring objects between a plurality of displays. In some embodiments, the method 700 is performed by an apparatus, such as an information handling device (e.g., information handling device 100A, 100B, and 100C). In other embodiments, the method 700 may be performed by one or more modules, such as the object transfer module(s) 106 and/or one or more modules included therein. In certain embodiments, the method 700 may be performed by a processor 110 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 700 begins by detecting an edge swipe on an object of a first touch screen (block 702). The edge swipe can be a single-finger edge swipe or a multi-finger edge swipe (e.g., a two-finger edge swipe, three-finger edge swipe, four-finger edge swipe, etc.). The object can be a single object (e.g., object 502A or 602A), a plurality of objects (e.g., objects 502A through 502n or objects 602A through 602n) on a screen, or the entire contents of the first touch screen of a display (e.g., display 102A, display 102B, display 102C, display 104A, display 104B, and display 104C).

The method 700 further includes moving or transferring the object from the first touch screen to a second touch screen in response to detecting the edge swipe (block 704). The second touch screen is on a different one of the displays 102A, display 102B, display 102C, display 104A, display 104B, and display 104C. In various embodiments, the object is transferred/moved from display 102A to display 104A, from display 104A to display 102A, from display 102B to display 104B, from display 104B to display 102B, from display 102C to display 104C, or from display 104C to display 102C.

Figure 8:
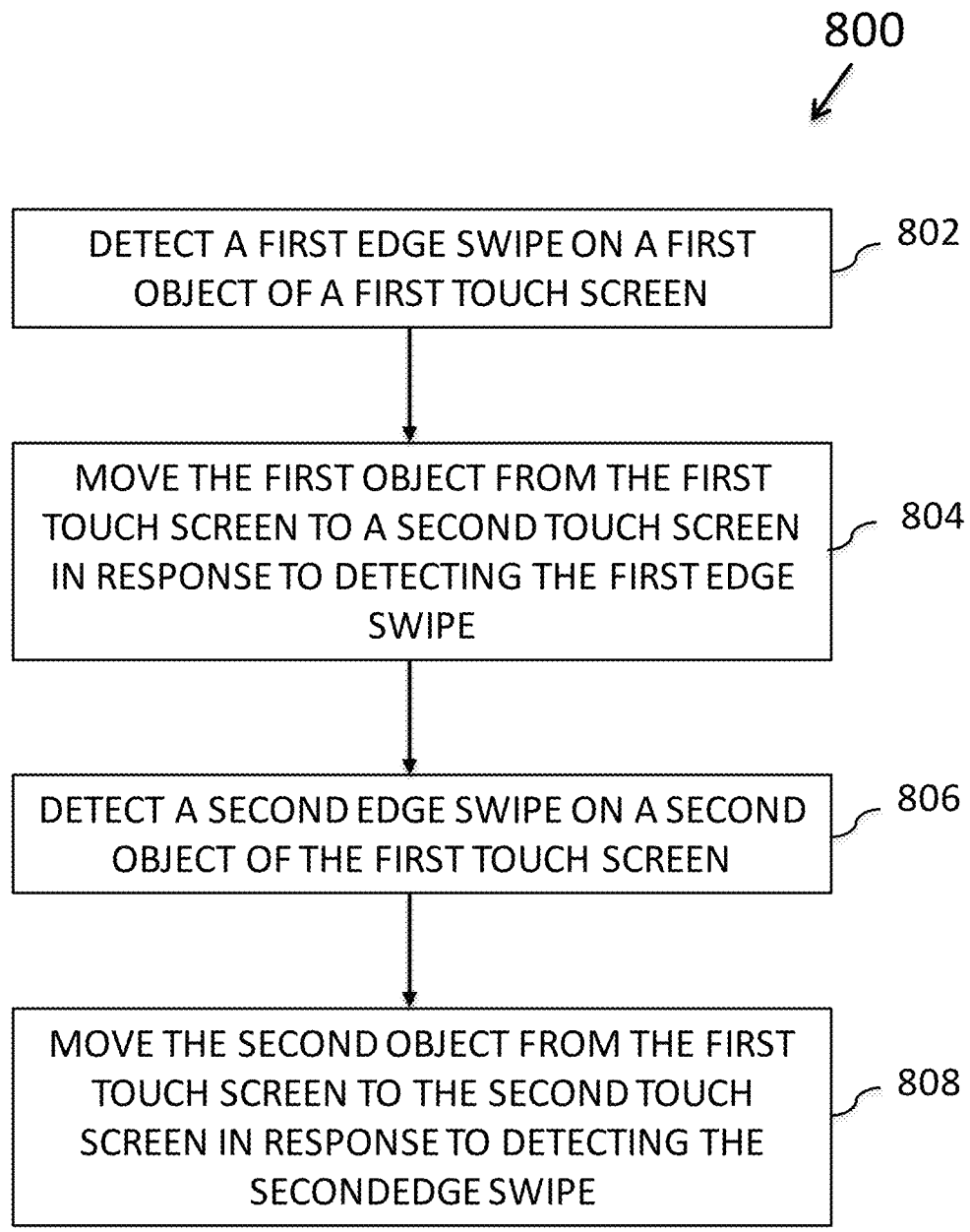
FIG. 8 is a schematic flow chart diagram illustrating one embodiment of a method for transferring objects between a plurality of displays.

FIG. 8 is a schematic flow chart diagram illustrating another embodiment of a method 800 for transferring objects between a plurality of displays. In some embodiments, the method 800 is performed by an apparatus, such as an information handling device (e.g., information handling device 100A, 100B, and 100C). In other embodiments, the method 800 may be performed by one or more modules, such as the object transfer module(s) 106 and/or one or more modules included therein. In certain embodiments, the method 800 may be performed by a processor 110 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 800 begins by detecting a first edge swipe on a first object of a first touch screen (block 802). The first edge swipe can be a single-finger edge swipe or a multi-finger edge swipe (e.g., a two-finger edge swipe, three-finger edge swipe, four-finger edge swipe, etc.). The first object can be a single object (e.g., object 502A or 602A), a plurality of objects (e.g., objects 502A through 502n or objects 602A through 602n) on a screen, or the entire contents of the first touch screen of a display (e.g., display 102A, display 102B, display 102C, display 104A, display 104B, and display 104C).

The method 800 further includes moving or transferring the first object from the first touch screen to a second touch screen in response to detecting the first edge swipe (block 804). The second touch screen is on a different one of the displays 102A, display 102B, display 102C, display 104A, display 104B, and display 104C. In various embodiments, the first object is transferred/moved from display 102A to display 104A, from display 104A to display 102A, from display 102B to display 104B, from display 104B to display 102B, from display 102C to display 104C, or from display 104C to display 102C.

In some embodiments, the method 800 further includes detecting a second edge swipe on a second object of the first touch screen (block 806). The second edge swipe can be a single-finger edge swipe or a multi-finger edge swipe (e.g., a two-finger edge swipe, three-finger edge swipe, four-finger edge swipe, etc.). In some embodiments, the second edge swipe includes the same quantity of user fingers as the first edge swipe. For example, the first edge swipe and the second edge swipe are single-finger edge swipes or the first edge swipe is a multi-finger edge swipe and the second edge swipe are multi-finger edge swipes.

In further embodiments, the second edge swipe includes a different quantity of user fingers than the first edge swipe. For example, the first edge swipe is a single-finger edge swipe and the second edge swipe is a multi-finger edge swipe or the first edge swipe is a multi-finger edge swipe and the second edge swipe is a single-finger edge swipe.

The second object can be a single object (e.g., object 502A or 602A), a plurality of objects (e.g., objects 502A through 502n or objects 602A through 602n) on a screen, or the entire contents of the first touch screen of a display (e.g., display 102A, display 102B, display 102C, display 104A, display 104B, and display 104C). The first object and the second object can be the same type of object or different types of objects. For example, the first object can be a single object and the second object can be the entire contents of a touch screen or vice-versa.

The method 800 further includes moving or transferring the second object from the first touch screen to the second touch screen in response to detecting the second edge swipe (block 808). In various embodiments, the first edge swipe and second edge swipe are different edge swipes or the same edge swipe. In additional or alternative embodiments, the first object and the second object are the same type of objects or different objects.

For example, the first and second edge swipes are single-finger edge swipes and the first object is a single object and the second object is the entire contents of the touch screen such that a single-finger edge swipe can be utilized to transfer/move the first and second objects between the first and second touch screens. In another example, the first and second edge swipes are multi-finger edge swipes and the first object is a single object and the second object is the entire contents of the touch screen such that a multi-finger edge swipe can be utilized to transfer/move the first and second objects between the first and second touch screens. In still another example, the first edge swipe is a single-finger edge swipe, the second edge swipe is a multi-finger edge swipe, the first object is a single object, and the second object is the entire contents of the touch screen such that a single-finger edge swipe can be utilized to transfer/move a single object between the first and second touch screens and a multi-finger edge swipe can be utilized to transfer/move the entire contents between the first and second touch screens. In yet another example, the first edge swipe is a multi-finger edge swipe, the second edge swipe is a single-finger edge swipe, the first object is a single object, and the second object is the entire contents of the touch screen such that a multi-finger edge swipe can be utilized to transfer/move a single object between the first and second touch screens and a single-finger edge swipe can be utilized to transfer/move the entire contents between the first and second touch screens.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor of an information handling device; and
   a memory that stores code executable by the processor to:
   detect a first edge swipe performed by a first set of user fingers or a second edge swipe performed by a second set of user fingers on a first touch screen of a computing device,
   move an object displayed on the first touch screen to a second touch screen in response to detecting the first edge swipe,
   move an entire screen displayed on the first touch screen to the second touch screen of the computing device in response to detecting the second edge swipe,
   wherein:
   the first set of user fingers includes a single user finger,
   the second set of user fingers includes at least two user fingers, and
   the first edge swipe and the second edge swipe each includes a direction from the first touch screen of the computing device toward a physical location of the second touch screen of the computing device.

2. The apparatus of claim 1, wherein:
   the object comprises an applet; and
   the entire screen displayed on the first touch screen comprises every object displayed on the first touch screen.

3. The apparatus of claim 1, wherein:
   the first touch screen is one of a main display and a sub-display; and
   the second touch screen is a different one of the main display and the sub-display than the first touch screen.

4. The apparatus of claim 1, wherein:
   the first touch screen is a main display; and
   the second touch screen is a sub-display.

5. The apparatus of claim 1, wherein:
   the first touch screen is a sub-display; and
   the second touch screen is a main display.

6. A method, comprising:
   detecting, by a processor, a first edge swipe performed by a first set of user fingers or a second edge swipe performed by a second set of user fingers on a first touch screen of a computing device;
   moving an object displayed on the first touch screen to a second touch screen in response to detecting the first edge swipe; and
   moving an entire screen displayed on the first touch screen to the second touch screen of the computing device in response to detecting the second edge swipe,
   wherein:

the first set of user fingers includes a single user finger,
the second set of user fingers includes at least two user fingers, and
the first edge swipe and the second edge swipe each includes a direction from the first touch screen of the computing device toward a physical location of the second touch screen of the computing device.

7. The method of claim 6, wherein:
the object comprises an applet; and
the entire screen displayed on the first touch screen comprises every object displayed on the first touch screen.

8. A program product comprising a non-transitory computer-readable storage medium that stores code executable by a processor, the executable code comprising code to perform:
detecting a first edge swipe performed by a first set of user fingers or a second edge swipe performed by a second set of user fingers on a first touch screen of a computing device;
moving an object displayed on the first touch screen to a second touch screen in response to detecting the first edge swipe; and
moving an entire screen displayed on the first touch screen to the second touch screen of the computing device in response to detecting the second edge swipe, wherein:
the first set of user fingers includes a single user finger,
the second set of user fingers includes at least two user fingers, and
the first edge swipe and the second edge swipe each includes a direction from the first touch screen of the computing device toward a physical location of the second touch screen of the computing device.

9. The program product of claim 8, wherein:
the object comprises an applet; and
the entire screen displayed on the first touch screen comprises every object displayed on the first touch screen.

10. The apparatus of claim 3, wherein:
the object comprises an applet; and
the entire screen displayed on the first touch screen comprises every object displayed on the first touch screen.

11. The apparatus of claim 4, wherein:
the object comprises an applet; and
the entire screen displayed on the first touch screen comprises every object displayed on the first touch screen.

12. The apparatus of claim 5, wherein:
the object comprises an applet; and
the entire screen displayed on the first touch screen comprises every object displayed on the first touch screen.

13. The method of claim 6, wherein:
the first touch screen is a main display; and
the second touch screen is a sub-display.

14. The method of claim 13, wherein:
the object comprises an applet; and
the entire screen displayed on the first touch screen comprises every object displayed on the first touch screen.

15. The method of claim 6, wherein:
the first touch screen is a sub-display; and
the second touch screen is a main display.

16. The method of claim 15, wherein:
the object comprises an applet; and
the entire screen displayed on the first touch screen comprises every object displayed on the first touch screen.

17. The program product of claim 8, wherein:
the first touch screen is a main display; and
the second touch screen is a sub-display.

18. The program product of claim 17, wherein:
the object comprises an applet; and
the entire screen displayed on the first touch screen comprises every object displayed on the first touch screen.

19. The program product of claim 8, wherein:
the first touch screen is a sub-display; and
the second touch screen is a main display.

20. The program product of claim 19, wherein:
the object comprises an applet; and
the entire screen displayed on the first touch screen comprises every object displayed on the first touch screen.

* * * * *